(12) United States Patent
Dejneka et al.

(10) Patent No.: US 12,071,369 B2
(45) Date of Patent: Aug. 27, 2024

(54) S-SHAPED STRESS PROFILES AND METHODS OF MAKING

(71) Applicant: CORNING INCORPORATED, Corning, NY (US)

(72) Inventors: Matthew John Dejneka, Corning, NY (US); Pascale Oram, Painted Post, NY (US); Rostislav Vatchev Roussev, Painted Post, NY (US); Vitor Marino Schneider, Painted Post, NY (US); Charlene Marie Smith, Corning, NY (US); Zhongzhi Tang, Guangdong (CN)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/105,040

(22) Filed: Feb. 2, 2023

(65) Prior Publication Data

US 2023/0174422 A1 Jun. 8, 2023

Related U.S. Application Data

(63) Continuation of application No. 16/837,286, filed on Apr. 1, 2020, now Pat. No. 11,584,684, which is a continuation of application No. 15/372,520, filed on Dec. 8, 2016, now Pat. No. 10,611,681.

(60) Provisional application No. 62/280,376, filed on Jan. 19, 2016, provisional application No. 62/264,495, filed on Dec. 8, 2015.

(51) Int. Cl.
*C03C 21/00* (2006.01)
*C03C 3/097* (2006.01)
*G06F 1/16* (2006.01)

(52) U.S. Cl.
CPC .......... *C03C 21/002* (2013.01); *C03C 3/097* (2013.01); *G06F 1/1637* (2013.01)

(58) Field of Classification Search
None
See application file for complete search history.

(56) References Cited

U.S. PATENT DOCUMENTS 3,798,013 A 3/1974 Inoue et al.
8,756,262 B2 6/2014 Zhang
8,854,623 B2 10/2014 Fontaine et al.
(Continued)

FOREIGN PATENT DOCUMENTS

CN 104114503 A 10/2014
CN 104628266 A 5/2015
(Continued)

OTHER PUBLICATIONS

Chinese Patent Application No. 201680072168.0, Office Action dated Jan. 13, 2021; 5 pages (English Translation Only); Chinese Patent Office.
(Continued)

*Primary Examiner* — David Sample
(74) *Attorney, Agent, or Firm* — Payal Patel

(57) ABSTRACT

A strengthened glass having a stress profile that differs from error-function and parabolic profiles. Stress relaxation and thermal annealing/diffusion effects, which occur at longer ion exchange and/or anneal times increase the depth of compression of the surface layer. A method of achieving these effects is also provided.

20 Claims, 17 Drawing Sheets

(56) References Cited

U.S. PATENT DOCUMENTS

| | | |
|---|---|---|
| 9,140,543 B1 | 9/2015 | Allan et al. |
| 9,156,724 B2 | 10/2015 | Gross |
| 9,346,703 B2 | 5/2016 | Bookbinder et al. |
| 9,359,251 B2 | 6/2016 | Bookbinder et al. |
| 9,487,434 B2 | 11/2016 | Amin et al. |
| 9,593,042 B2 | 3/2017 | Hu et al. |
| 9,828,282 B2 | 11/2017 | Beall et al. |
| 10,150,698 B2 | 12/2018 | Amin et al. |
| 10,271,442 B2 | 4/2019 | Gross et al. |
| 10,611,681 B2 | 4/2020 | Dejneka et al. |
| 11,584,684 B2 * | 2/2023 | Dejneka ............... G06F 1/1637 |
| 2012/0194974 A1 | 8/2012 | Weber et al. |
| 2013/0224492 A1 | 8/2013 | Bookbinder et al. |
| 2014/0087193 A1 | 3/2014 | Cites et al. |
| 2015/0030834 A1 | 1/2015 | Morey et al. |
| 2015/0064472 A1 | 3/2015 | Gross et al. |
| 2015/0239775 A1 | 8/2015 | Amin et al. |
| 2015/0239776 A1 | 8/2015 | Amin et al. |
| 2015/0259244 A1 | 9/2015 | Amin et al. |
| 2015/0329413 A1 | 11/2015 | Beall et al. |
| 2015/0368148 A1 | 12/2015 | Duffy et al. |
| 2015/0368153 A1 | 12/2015 | Pesansky et al. |
| 2016/0083292 A1 | 3/2016 | Tabe et al. |
| 2016/0122239 A1 | 5/2016 | Amin et al. |
| 2016/0122240 A1 | 5/2016 | Oram et al. |
| 2016/0257605 A1 | 9/2016 | Amin et al. |
| 2016/0264452 A1 | 9/2016 | Amin et al. |
| 2017/0022092 A1 | 1/2017 | Demartino et al. |
| 2017/0197384 A1 | 7/2017 | Finkeldey et al. |

FOREIGN PATENT DOCUMENTS

| | | | |
|---|---|---|---|
| CN | 104870393 | A | 8/2015 |
| EP | 1291631 | A1 | 3/2003 |
| JP | 2015-003857 | A | 1/2015 |
| JP | 2015-511573 | A | 4/2015 |
| KR | 10-2014-0084588 | A | 7/2014 |
| KR | 10-2014-0131558 | A | 11/2014 |
| TW | 201341324 | A | 10/2013 |
| TW | 201607910 | A | 3/2016 |
| TW | 201623165 | A | 7/2016 |
| TW | 201623177 | A | 7/2016 |
| WO | 2011/097314 | A2 | 8/2011 |
| WO | 2013/130653 | A2 | 9/2013 |
| WO | 2015/031148 | A1 | 3/2015 |
| WO | 2015/127483 | A2 | 8/2015 |
| WO | 2015/127583 | A1 | 9/2015 |
| WO | 2015/195419 | A2 | 12/2015 |
| WO | 2015/195465 | A1 | 12/2015 |
| WO | 2016/007910 | A1 | 1/2016 |
| WO | 2016/014937 | A1 | 1/2016 |
| WO | 2016/057590 | A1 | 4/2016 |

OTHER PUBLICATIONS

European Patent Application No. 16820425.3 Observation by Third Party dated Jan. 26, 2021; 4 Pages; European Patent Office.

Green, D.J., "Critical parameters in the processing of engineered stress profile glasses", Journal of Non-Crystalline Solids, vol. 316, No. 1, 2003, 35-41.

International Search Report and Written Opinion of the International Searching Authority; PCT/US2016/065518; Mailed Mar. 31, 2017; 10 Pages; European Patent Office.

Japanese Patent Application No. 2018-529279, Office Action dated Oct. 30, 2020, 11 pages (6 pages of English Translation and 5 pages of Original Document); Japanese Patent Office.

Taiwanese Patent Application No. 110105313, Office Action dated Aug. 3, 2021, 2 pages (English Translation Only); Taiwanese Patent Office.

* cited by examiner

S-SHAPED STRESS PROFILES AND METHODS OF MAKING

CROSS-REFERENCE TO RELATED APPLICATIONS

This application is a continuation of U.S. application Ser. No. 16/837,286, filed Apr. 1, 2020, which is a continuation of U.S. application Ser. No. 15/372,520, filed Dec. 8, 2016, which claims the benefit of priority under 35 U.S.C. § 119 of U.S. Provisional Application Ser. No. 62/280,376, filed Jan. 19, 2016, and U.S. Provisional Application Ser. No. 62/264,495, filed Dec. 8, 2015, the contents of which are relied upon and incorporated herein by reference in their entirety.

BACKGROUND

The disclosure relates to strengthened glass. More particularly, the disclosure relates to strengthened glass having a deep compressive layer.

Glasses strengthened by ion exchange tend to exhibit stress profiles that resemble a complementary error function or a parabolic function. While such stress profiles provide adequate protection for certain types of damage, such as sharp impacts, they do not provide sufficient protection for other types of insult, such as a drop from a height onto an abrasive surface.

SUMMARY

The present disclosure provides a strengthened glass having a stress profile that differs from error-function and parabolic profiles that have previously been observed for such glasses. Stress relaxation and thermal annealing/diffusion effects, which occur at longer ion exchange and/or anneal times, increase the depth of compression (DOC) of the surface layer. A method of achieving these effects is also provided.

Accordingly, one aspect of the disclosure provides a glass article having a thickness (t) and a center at t/2. The glass has a first compressive layer under a first compressive stress (CS1), the compressive layer extending from a first surface of the glass to a first depth of compression (DOC1). The stress in the glass varies as a function of the thickness (t) to form a stress profile comprising: a first region extending from the first surface to a depth (d1) into the glass, wherein d1>0.06t and wherein at least a portion of the first region has a first slope (m1); and a second region extending from a depth of at least d1 to the first depth of compression (DOC1) and having a second slope (m2), wherein |m1|≤|m2|.

Another aspect of the disclosure provides a glass article strengthened by ion exchange, the glass article having a thickness (t) and a center at t/2. The glass article comprises: a compressive region on either side of the center, wherein the compressive region extends from a surface of the glass article to a depth of compression (DOC) and is under a compressive stress; and a tensile region extending from the depth of compression (DOC) to the center of the glass article, wherein the tensile region is under a physical center tension (CT). The stress in the glass varies as a function of the thickness (t) to form a stress profile comprising a sub-region within the compressive region in which the stress profile has a negative curvature, wherein the maximum absolute value of the negative curvature is between 20 MPa/(t(mm))$^2$ and 4,000 MPa/(t(mm))$^2$.

Yet another aspect of the disclosure provides a glass article strengthened by an ion exchange process followed by a thermal diffusion/annealing step. The glass article has a thickness (t) and a center at t/2, and a first compressive layer under a first compressive stress (CS1) that extends from a first surface of the glass to a first depth of compression (DOC1). The glass also comprises a tensile region extending from the first depth of compression (DOC1) to the center of the glass that is under a physical center tension (CT). The stress in the glass varies as a function of the thickness (t) to form a stress profile. The stress profile comprises: a first region extending from the first surface to a depth (d1) into the glass, wherein d1>0.06t and wherein at least a portion of the first region has a first slope (m1); and a second region extending from a depth of at least d1 to the first depth of compression (DOC1) and having a second slope (m2), wherein |m1|≤|m2|.

Still another aspect of the disclosure provides a method of strengthening a glass comprising first alkali cations. The glass has a first surface, a second surface opposite the first surface, a thickness (t), and a center at t/2. The method comprises: immersing the glass in an ion exchange bath comprising second alkali cations, wherein the second alkali cations are different from the first alkali cations, and replacing the first alkali cations within the glass with the second alkali cations from the ion exchange bath to form a compressive layer extending from the first surface and second surface of the glass to a first depth of compression (DOC1), where the compressive layer is under a first compressive stress (CS1) at the surface; and diffusing the second alkali cations from the first surface and the second surface to the center of the glass. The stress in the glass varies as a function of the thickness (t) to form a stress profile. The stress profile comprises: a first compressive region extending from each of the first surface and the second surface to a depth (d1) into the glass, wherein d1>0.06t and wherein at least a portion of the first region has a first slope (m1), and a second compressive stress (CS2) at each of the first surface and the second surface, wherein CS2≤CS1; and a second compressive region extending from a depth of at least d1 to a second depth of compression (DOC2) and having a second slope (m2), wherein |m1|≤|m2|, and wherein DOC2>DOC1.

In a first aspect a glass article is provided. The glass article comprises: a thickness t, a center located at t/2, a first compressive layer extending from a first surface of the glass article to a first depth of compression DOC1, and a first maximum compressive stress CS1 within the first compressive layer. The first compressive layer has a stress profile. The stress profile comprises a first region extending from the first surface to a depth d1 into the glass article, wherein d1>0.06t, and at least a portion of the first region has a first slope m1, and a second region extending from a depth of at least d1 to the first depth of compression DOC1 and having a second slope m2, wherein |m1|≤|m2|.

In a second aspect, the glass article of the first aspect is provided wherein the stress profile comprises a sub-region within the compressive region with a negative curvature, wherein the maximum absolute value of the negative curvature is at d1.

In a third aspect, the glass article of any of the preceding aspects is provided wherein the maximum absolute value of the negative curvature is between 20 MPa/(t(mm))2 and 4,000 MPa/(t(mm))2.

In a fourth aspect, the glass article of any of the preceding aspects is provided wherein a slope of the stress profile at d1 is zero.

In a fifth aspect, the glass article of any of the preceding aspects is provided wherein DOC1≥0.2t.

In a sixth aspect, the glass article of any of the preceding aspects is provided wherein CS1>0, m1>0 and m2<0.

In a seventh aspect, the glass article of any of the preceding aspects is provided wherein t is in a range from about 0.1 mm to about 2 mm.

In an eighth aspect, the glass article of any of the preceding aspects is provided wherein DOC1 is in a range from about 0.14t to about 0.35t.

In a ninth aspect, the glass article of any of the preceding aspects is provided wherein; the first maximum compressive stress CS1 is at the first surface and is in a range from about 500 MPa to about 2,000 MPa, and the stress profile further comprises a second sub-region having a positive curvature.

In a tenth aspect, the glass article of any of the preceding aspects is provided wherein the negative curvature of the first sub-region has an absolute value exceeding 10 MPa/(t(mm))$^2$ over a spatial extent ranging from about 2% to about 25% of t.

In an eleventh aspect, the glass article of any of the preceding aspects is provided wherein: the first maximum compressive stress CS1 is at the first surface, and the compressive stress decreases to less than 50% of the first maximum compressive stress CS1 at a depth of less than about 8 μm below the first surface.

In a twelfth aspect, the glass article of any of the preceding aspects is provided further comprising a physical center tension in a range from about 40 MPa/(t(mm))1/2 to about 150 MPa/(t(mm))1/2.

In a thirteenth aspect, the glass article of any of the preceding aspects is provided wherein the second region of the stress profile comprises an inflection point.

In a fourteenth aspect, the glass article of any of the preceding aspects is provided wherein: the first region of the stress profile further comprises a sub-region extending from the first surface to a depth d2, d2<d1, the sub-region comprising at least a portion with a third slope m3, |m1|<|m3|, and 30 MPa/μm≤|m3|≤200 MPa/μm.

In a fifteenth aspect, the glass article of any of the preceding aspects is provided wherein 50 MPa/μm≤|m3|≤200 MPa/μm.

In a sixteenth aspect, the glass article of any of the preceding aspects is provided wherein the glass article comprises an alkali aluminosilicate glass.

In a seventeenth aspect, the glass article of the sixteenth aspect is provided wherein the alkali aluminosilicate glass comprises at least about 4 mol % $P_2O_5$, wherein ($M_2O_3$(mol %)/$R_xO$(mol %))<1, where $M_2O_3$=$Al_2O_3$+$B_2O_3$, and where $R_xO$ is the sum of monovalent and divalent cation oxides present in the alkali aluminosilicate glass.

In an eighteenth aspect, the glass article of the sixteenth aspect is provided wherein the alkali aluminosilicate glass comprises:
about 40 mol % to about 70 mol % $SiO_2$;
about 11 mol % to about 25 mol % $Al_2O_3$;
about 2 mol % to about 15 mol % $P_2O_5$;
about 10 mol % to about 25 mol % $Na_2O$;
about 10 to about 30 mol % $R_xO$, where $R_xO$ is the sum of the alkali metal oxides, alkaline earth metal oxides, and transition metal monoxides present in the glass.

In a nineteeth aspect, the glass article of any of the preceding aspects is provided further comprising: a second compressive layer extending from a second surface of the glass article opposite the first surface to a second depth of compression DOC2, a second maximum compressive stress CS2 within the second compressive layer, and a tensile region extending from DOC1 to DOC2.

In a twentieth aspect, the glass article of the nineteenth aspect is provided wherein DOC1=DOC2.

In a twenty-first aspect a glass article is provided. The glass article comprises: a thickness t, a center located at t/2, a compressive region located between a surface of the glass article and the center, wherein the compressive region is under a compressive stress and extends from the surface to a depth of compression DOC; a sub-region within the compressive region in which a stress profile has a negative curvature, wherein the maximum absolute value of the negative curvature is between 20 MPa/(t(mm))2 and 4000 MPa/(t(mm))2; and a tensile region extending from the depth of compression DOC to at least the center of the glass article, wherein the tensile region is under a physical center tension CT.

In a twenty-second aspect, the glass article of the twenty-first aspect is provided wherein t is in a range from about 0.1 mm to about 2 mm.

In a twenty-third aspect, the glass article of the twenty-first or twenty-second aspect is provided wherein DOC is in a range from about 0.14t to about 0.35t.

In a twenty-fourth aspect, the glass article of any of the twenty-first through twenty-third aspects is provided wherein: a maximum compressive stress CS1 is at the first surface and is in a range from about 500 MPa to about 2,000 MPa, and the compressive region further comprises a sub-region in which the stress profile has a sub-region of positive curvature.

In a twenty-fifth aspect, the glass article of any of the twenty-first through twenty-fourth aspects is provided wherein: the glass article has a maximum compressive stress CS1 at the surface, and the compressive stress decreases to less than 50% of the maximum compressive stress at a depth of less than about 8 μm below the surface.

In a twenty-sixth aspect, the glass article of any of the twenty-first through twenty-fifth aspects is provided wherein the negative curvature has an absolute value exceeding 10 MPa/t$^2$ over a sub-region, the sub-region having a spatial extent ranging from about 2% to about 25% of t.

In a twenty-seventh aspect, the glass article of any of the twenty-first through twenty-sixth aspects is provided wherein CT is in a range from about 40 MPa/(t(mm))$^{1/2}$ to about 150 MPa/(t(mm))$^{1/2}$.

In a twenty-eighth aspect, the glass article of any of the twenty-first through twenty-seventh aspects is provided wherein the glass article comprises an alkali aluminosilicate glass.

In a twenty-ninth aspect, the glass article of the twenty-eighth aspect is provided wherein the alkali aluminosilicate glass comprises at least about 4 mol % $P_2O_5$, wherein ($M_2O_3$(mol %)/$R_xO$(mol %))<1, wherein $M_2O_3$=$Al_2O_3$+$B_2O_3$, and wherein $R_xO$ is the sum of monovalent and divalent cation oxides present in the alkali aluminosilicate glass.

In a thirtieth aspect, the glass article of the twenty-eighth aspect is provided wherein the alkali aluminosilicate glass comprises: about 40 mol % to about 70 mol % $SiO_2$; about 11 mol % to about 25 mol % $Al_2O_3$; about 2 mol % to about 15 mol % $P_2O_5$; about 10 mol % to about 25 mol % $Na_2O$; about 13 to about 30 mol % $R_xO$, where $R_xO$ is the sum of the alkali metal oxides, alkaline earth metal oxides, and transition metal monoxides present in the glass.

In a thirty-first aspect a method of strengthening a glass is provided. The method comprising: immersing a glass comprising first alkali cations in an ion exchange bath comprising second alkali cations to replace the first alkali cations within the glass with the second alkali cations from the ion exchange bath and form a first compressive layer extending from a first surface of the glass, wherein the glass has a thickness t, the second alkali cations are different from the first alkali cations, the first surface is opposite a second surface, the first compressive layer extends from the first surface to a first depth of compression DOC1, and the first compressive layer has a first compressive stress CS1; and diffusing the second alkali cations from the first surface to a center of the glass located at t/2, wherein stress in the glass varies as a function of the depth in the glass to form a stress profile. The stress profile comprises a first compressive region extending from the first surface to a depth d1 in the glass, wherein d1>0.06t, and at least a portion of the first region has a first slope m1, and a second compressive stress CS2 at the first surface, wherein CS2≤CS1; and a second compressive region extending from a depth of at least d1 to a second depth of compression DOC2 and having a second slope m2, wherein |m1|≤|m2|, and DOC2>DOC1.

In a thirty-second aspect, the method of the thirty-first aspect is provided wherein immersing the glass in the ion exchange bath comprising the second alkali cations also replaces the first alkali cations within the glass with the second alkali cations from the ion exchange bath to form a second compressive layer extending from the second surface of the glass.

In a thirty-third aspect, the method of the thirty-second aspect is provided wherein the first compressive layer and the second compressive layer are formed simultaneously.

In a thirty-fourth aspect, the method of any of the thirty-first through thirty-third aspects is provided wherein a slope of the stress profile at d1 is zero.

In a thirty-fifth aspect, the method of any of the thirty-first through thirty-fourth aspects is provided wherein the diffusing comprises a thermal diffusion step comprising heating the glass to a temperature in a range from about 400° C. to about 500° C.

In a thirty-sixth aspect, the method of the thirty-fifth aspect is provided wherein the thermal diffusion step comprises heating the glass for at least about 16 hours at the temperature.

In a thirty-seventh aspect, the method of any of the thirty-first through thirty-sixth aspects is provided wherein the ion exchange bath comprises at least 30 wt % of a salt comprising the first alkali cations.

In a thirty-eighth aspect, the method of any of the thirty-first through thirty-seventh aspects is provided further comprising immersing the glass in a second ion exchange bath following the step of immersing the glass in the ion exchange bath to form a surface compressive region comprising a third compressive stress CS3 at the first surface, wherein CS3>CS1.

In a thirty-ninth aspect, the method of the thirty-eighth aspect is provided wherein the second ion exchange bath comprises at least about 90 wt % of a salt comprising the second alkali cations.

In a fortieth aspect, the method of any of the thirty-first through thirty-ninth aspects is provided wherein the glass comprises an alkali aluminosilicate glass.

In a forty-first aspect, the method of the fortieth aspect is provided wherein the alkali aluminosilicate glass comprises at least about 4 mol % $P_2O_5$, wherein $(M_2O_3(mol\%)/R_xO(mol\%))<1$, $M_2O_3=Al_2O_3+B_2O_3$, and $R_xO$ is the sum of monovalent and divalent cation oxides present in the alkali aluminosilicate glass.

In a forty-second aspect, the method of the fortieth aspect is provided wherein the alkali aluminosilicate glass comprises: about 40 mol % to about 70 mol % $SiO_2$; about 11 mol % to about 25 mol % $Al_2O_3$; about 2 mol % to about 15 mol % $P_2O_5$; about 10 mol % to about 25 mol % $Na_2O$; about 10 to about 30 mol % $R_xO$, where $R_xO$ is the sum of the alkali metal oxides, alkaline earth metal oxides, and transition metal monoxides present in the glass.

In a forty-third aspect, the method of any of the thirty-first through forty-second aspects is provided wherein the stress profile comprises a sub-region within the compressive region with a negative curvature, wherein the maximum absolute value of the negative curvature is at d1.

In a forty-fourth aspect, the method of forty-third aspect is provided wherein the maximum absolute value of the negative curvature is between 20 $MPa/(t(mm))^2$ and 4,000 $MPa/(t(mm))^2$.

In a forty-fifth aspect a consumer electronic product is provided. The consumer electronic product comprising: a housing having a front surface, a back surface and side surfaces; electrical components provided at least partially within the housing, the electrical components including at least a controller, a memory, and a display, the display being provided at or adjacent the front surface of the housing; and the glass article of any of the first through thirtieth aspects disposed over the display.

These and other aspects, advantages, and salient features will become apparent from the following detailed description, the accompanying drawings, and the appended claims.

DETAILED DESCRIPTION

Figure 1:
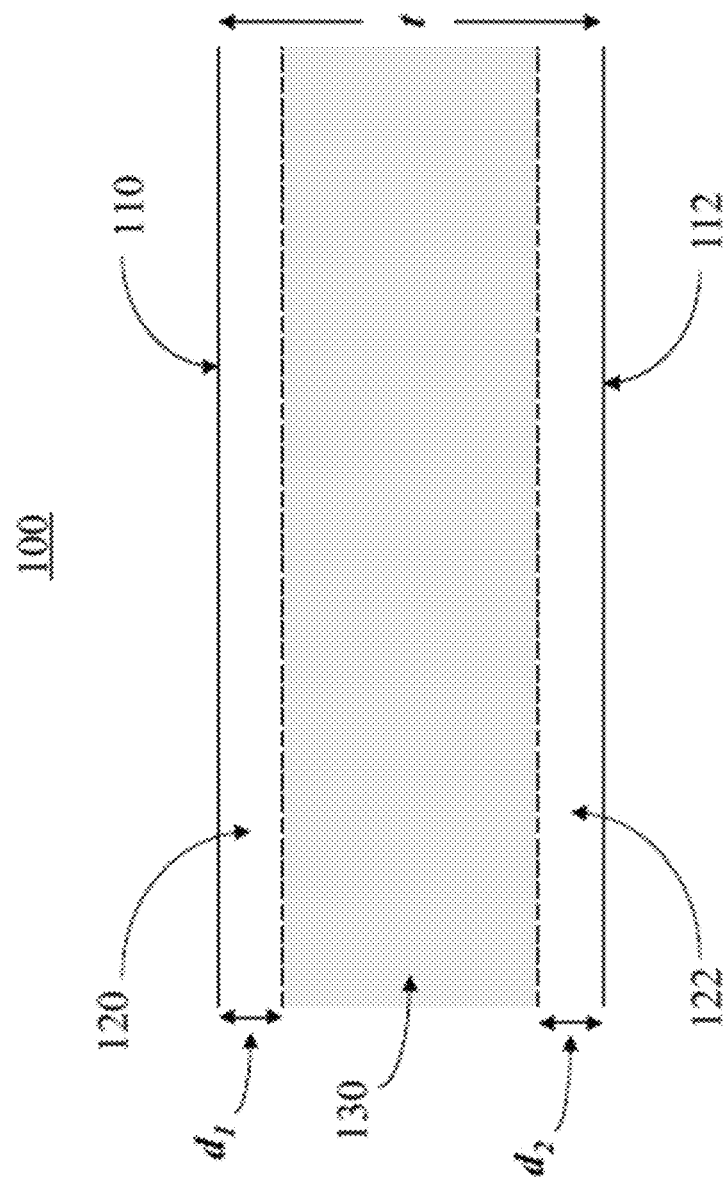
FIG. 1 is a schematic cross-sectional view of a strengthened glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %).

As described herein, compressive stress (CS) and central tension or physical center tension (CT) are expressed in terms of megaPascals (MPa), depth of layer (DOL) and depth of compression (DOC) may be used interchangeably and are expressed in terms of microns (μm), where 1 μm=0.001 mm, and, unless otherwise specified, thickness (t) is expressed herein in terms of millimeters, where 1 mm=1,000 μm. Compressive stress (CS) is expressed herein as a positive value and central tension and physical center tension (CT) are expressed as negative values.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

The stress profiles may also be determined from the spectra of bound optical modes for TM and TE polarization by using the inverse Wentzel-Kramers-Brillouin (IWKB) method as taught in U.S. Pat. No. 9,140,543, the contents of which are hereby incorporated by reference in its entirety.

Described herein are strengthened glass articles having a stress profile (σ) that varies as a function (σ(x)) of position (x) within the glass article. The position (x) may refer to the depth into the glass article from a surface thereof. The stress profile has a slope (S) at any point that is a first derivative of the stress (σ) with position (x); i.e., S=(dσ/dx). The slope of a segment or portion of the stress profile that closely approximates a straight line is defined as the average slope for regions that are well approximated as straight segments. The slope rate (SR) or stress curvature of the stress profile is the second derivative of the stress ($\sigma$) with position (x); i.e., $SR=(d^2\sigma/dx^2)$.

A schematic cross-sectional view of the strengthened glass article is shown in FIG. 1. Glass article 100 has a thickness t, a first surface 110, and a second surface 112. Glass article 100, in some embodiments, has a thickness t of up to about 2 mm, and all ranges and subranges therebetween, for example, from about 0.1 mm to about 2 mm in some embodiments, or from about 0.1 to about 1 mm in other embodiments. While the embodiment shown in FIG. 1 depicts glass article 100 as a flat planar sheet or plate, the glass article may have other configurations, such as three dimensional shapes or non-planar configurations. Glass article 100 has a first compressive layer 120 extending from first surface 110 to a depth of compression (DOC) $d_1$ into the bulk of the glass article 100. In the embodiment shown in FIG. 1, glass article 100 also has a second compressive layer 122 extending from second surface 112 to a second depth of compression $d_2$. First and second compressive layers 120, 122 are each under a compressive stress CS. In some embodiments, first and second compressive layers 120, 122 each have a maximum compressive stress at the first and second surfaces 110, 112, respectively. Glass article 100 also has a central region 130 that extends from $d_1$ to $d_2$. Central region 130 is under a tensile stress or physical center tension (CT), which balances or counteracts the compressive stresses of compressive layers 120 and 122. The depths of compression $d_1$, $d_2$ of first and second compressive layers 120, 122 protect the glass article 100 from the propagation of flaws introduced by sharp impact to first and second surfaces 110, 112 by minimizing the likelihood of a flaw penetrating through the depth $d_1$, $d_2$ of first and second compressive layers 120, 122.

Figure 12:
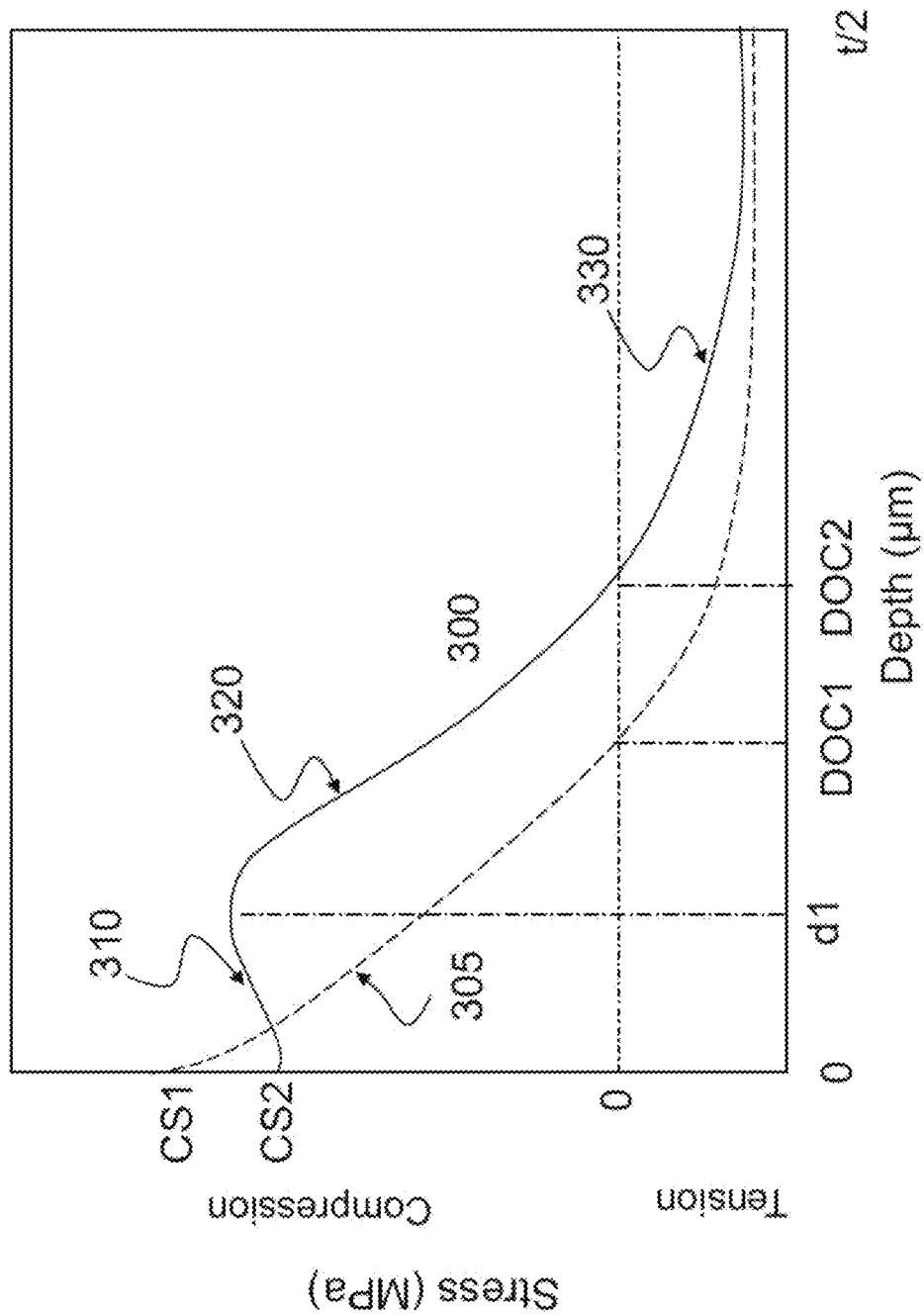
FIG. 12 is a schematic representation of stress profiles of a glass article following a first ion exchange and subsequent thermal treatment.

In one aspect, the stress in the strengthened glass article varies as a function of the depth, and has a compressive layer extending from a first surface of the glass to a depth of compression (DOC) or depth of layer (DOL). The compressive layer is under a compressive stress (CS). The stress profile of the glass article is schematically shown in FIG. 12. A single ion exchange step forms a compressive layer extending from the surface of the glass to a first depth of compression (DOC1), where the compressive layer is under a first compressive stress (CS1). The stress profile 305 obtained by the single ion exchange step may be either linear or may be approximated by a complementary error function (erfc).

The cations from the ion exchange bath may then be diffused from the surface of the glass to the center of the glass at a depth of t/2 in a thermal diffusion step. In some embodiments, this is achieved by allowing the ion exchange to proceed for longer time periods (e.g., 16 hours or more at 460° C.), and/or, in some embodiments, by a subsequent thermal diffusion (heating) step. The cations are allowed to diffuse from opposite surfaces of the glass until the diffused cations meet at the center of the glass 330. The thermal diffusion step in some embodiments results in a decrease in the compressive stress at the surface to a second compressive stress (CS2) and an increase in the depth of compression to a second depth of compression (DOC2) such that CS2≤CS1 and DOC2>DOC1.

The thermal diffusion step, in some embodiments, includes heating the glass to a temperature in a range from about 400° C. to about 500° C. for times ranging from at least about 0.5 hour to about 40 hours.

The slope (S1) following the first ion exchange step, expressed as CS1/DOC where CS1 is the compressive stress at the surface of the glass after the first ion exchange step, the absolute value of slope S1 (|S1|) is in a range from about 0.5 MPa/μm to about 30 MPa/μm. In some embodiments, the slope (S1) has an absolute value (|S1|), where 1.2 MPa/μm≤|S1|≤20 MPa/μm, 1.5 MPa/μm≤|S1|≤15 MPa/μm, and all ranges and subranges therebetween. In still other embodiments, slope (S1) has an absolute value |S1| in a range from about 0.6 MPa/μm to about 15 MPa/um, 0.8 MPa/μm≤|S1|≤10 MPa/μm, 1.5 MPa/μm≤|S1|≤10 MPa/μm, and all ranges and subranges therebetween.

Following the thermal diffusion step, the glass has a stress profile 300, schematically shown in FIG. 12, comprising a first region 310 extending from the first surface to a depth (d1) into the glass, wherein d1>0.06t and wherein at least a portion of the first region has a first slope (m1), and a second region 320 extending from a depth of at least d1 to the second depth of compression (DOC2) and having a second slope (m2), wherein |m1|≤|m2|. In some embodiments, as shown for example in FIG. 13, the slope of the stress profile at d1 may be zero, meaning the first derivative of the stress profile at d1 ((dσ/dx), where x=d1) is zero. In some embodiments, the stress profile contains a negative curvature and d1 may be at the point of the maximum absolute value of the negative curvature. In some embodiments, the first slope (m1) is greater than or equal to zero (m1>0) and the second slope (m2) is negative (m2<0).

Figure 13:
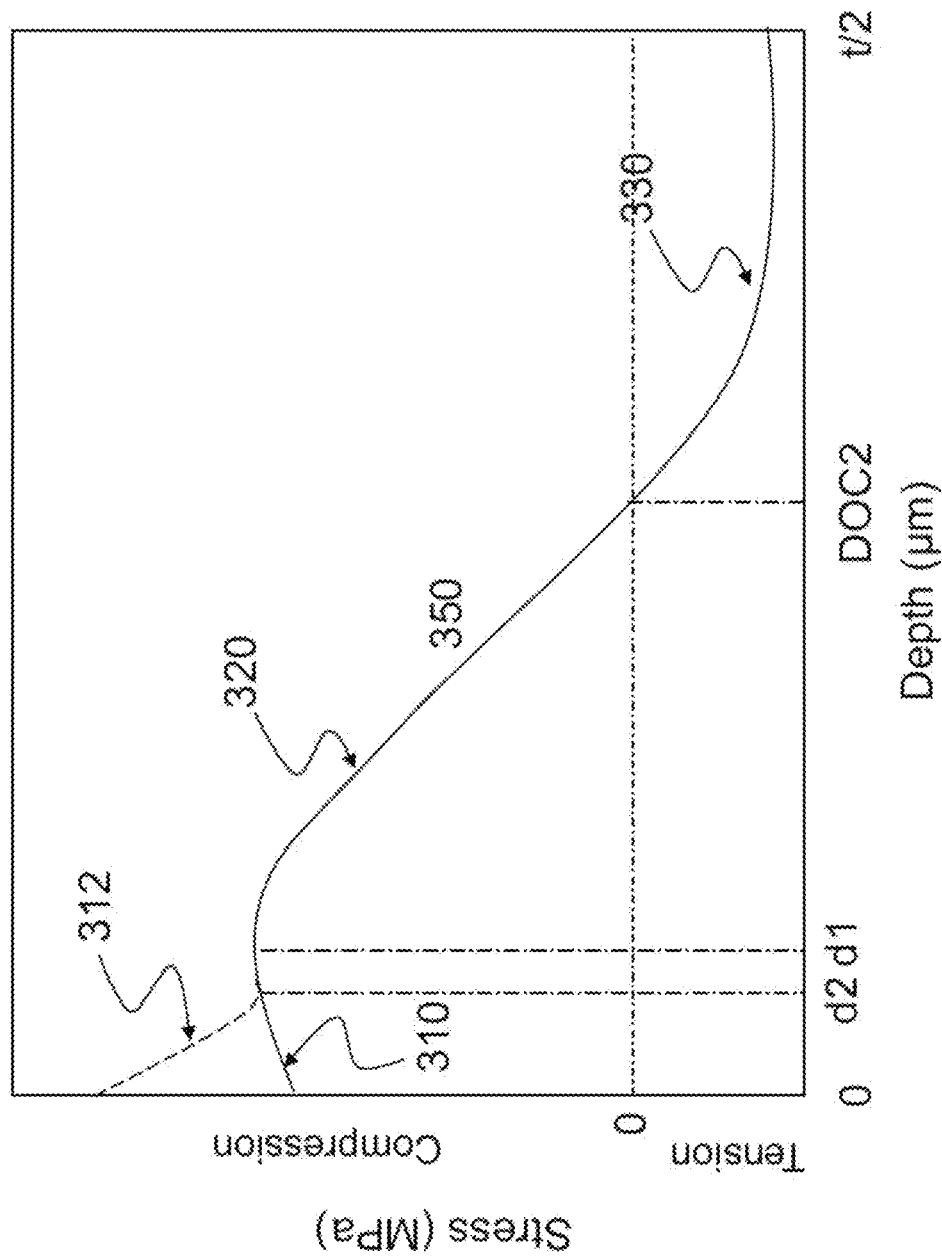
FIG. 13 is a schematic representation of stress profiles of a glass article following a first ion exchange, thermal treatment, and a second ion exchange.

In some embodiments, the glass article is strengthened by a two-step ion exchange process. Here the glass article is ion exchanged a second time following the thermal diffusion step. The second ion exchange is carried out in an ion exchange bath that differs in composition from the first ion exchange bath. The stress profile 350 obtained following the second ion exchange step is schematically shown in FIG. 13. The second step of the ion exchange process provides a compressive stress "spike" 312—i.e., a sharp increase in compressive stress—in a sub-region of first region 310, where the sub-region is adjacent to the surface of the glass article, extends to a second depth (d2) below the surface, and has a maximum compressive stress (CS). In some embodiments, d2<d1. Following the second ion exchange step, the slope of the spike region 312 (m3) has an absolute value (|m3|) in a range from about 30 MPa/μm to about 200 MPa/μm (30 MPa/μm≤|m3|≤200 MPa/μm). In some embodiments, 40 MPa/μm≤|m3|≤160 MPa/μm, other embodiments 50 MPa/μm≤|m3|≤200 MPa/μm, and, in still other embodiments, 45 MPa/μm≤|m3|≤120 MPa/μm. In some embodiments, |m1|<|m3|.

Figure 14:
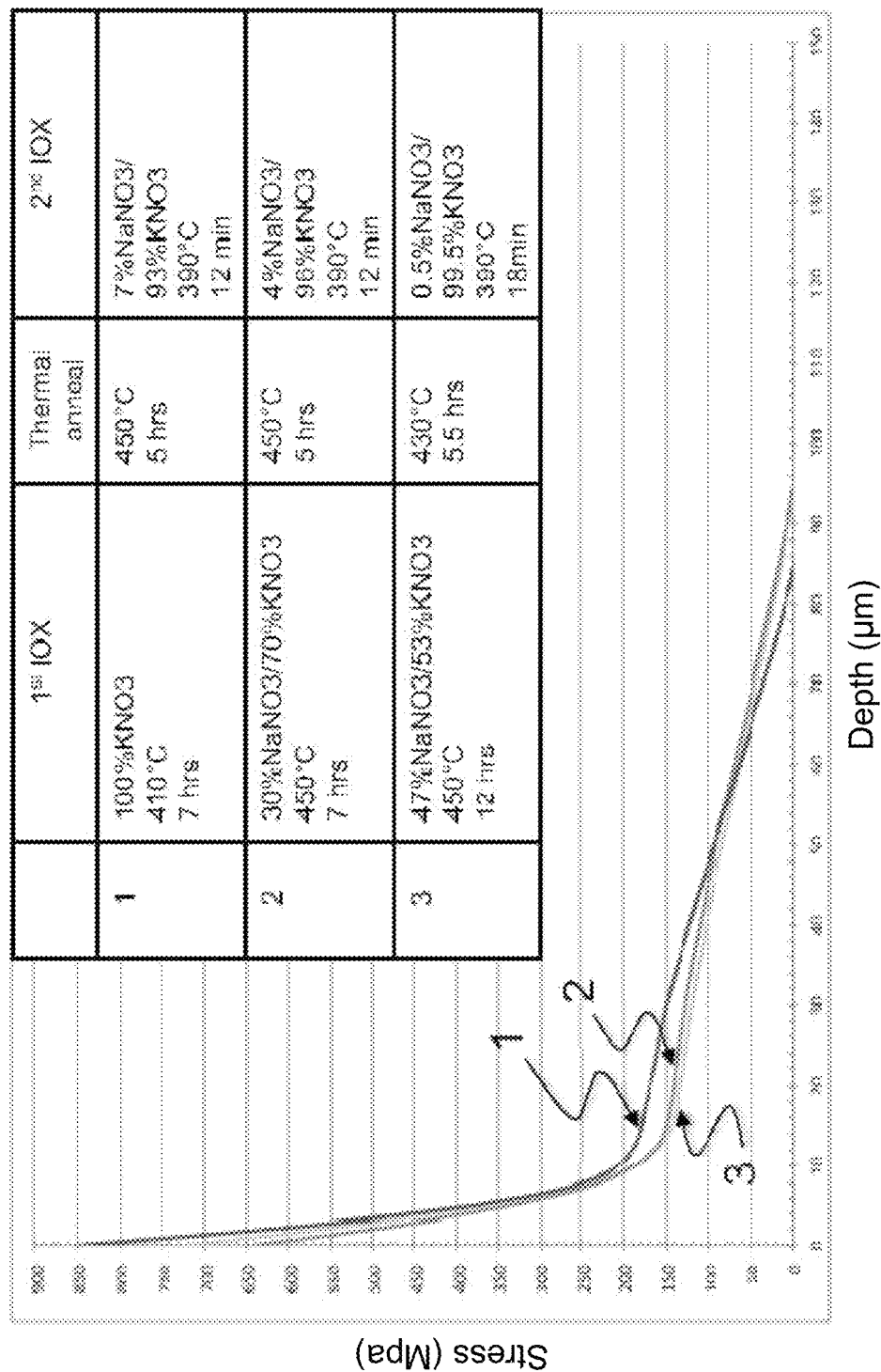
FIG. 14 is a plot of stress profiles of glasses obtained following a first ion exchange, thermal treatment, and a second ion exchange.

Stress profiles observed for samples that were subjected to a first ion exchange followed by thermal treatment and second ion exchange as described herein are plotted in FIG. 14. Conditions that were used to treat the samples are also included in the figure. All samples exhibit a sharp increase in compressive stress or "spike" near the surface and a region having some degree of negative curvature. As shown in FIG. 14, the spike compressive stress can be from greater than or equal to 150 MPa to less than or equal to 180 MPa.

In those embodiments in which the glass article is strengthened by a single-step ion exchange process, the slope S, which is expressed as CS/DOC, has an absolute value in a range from about 0.5 MPa/μm (or 88 MPa/(88 μm/2)) to about 200 MPa/μm (or 1,000 MPa/5 μm). In other embodiments, the slope (S), has an absolute value (|S|) in a range from about 0.6 MPa/μm (or 88 MPa/140 μm) to about 200 MPa/μm (or 1,000 MPa/5 μm).

The slope rate (SR) of the stress profile in the compressive layer between the surface and the depth of compression (DOC) includes at least one region where the SR value changes sign, indicating that the slope (S) of the stress profile is not a monotonically increasing or decreasing function. Instead, the slope (S) changes from a decreasing to an increasing pattern or vice-versa, thus defining a S-shaped region of the stress profile.

In some embodiments, the depth of compression is at least 20% of the thickness; i.e., DOC≥0.2t. The depth of compression (DOC), in some embodiments, is in a range from about 0.05t to about 0.35t, and all ranges and subranges therebetween, for example, in some embodiments from about 0.14t to about 0.35t, in other embodiments from about 0.15t to about 0.25t, and in still other embodiments, from about 0.20t to about 0.25t. The thickness (t) of the strengthened glass article is in a range from about 0.1 mm to about 2 mm, such as about 0.4 mm or less.

The compressive layer, in some embodiments, may further comprise a near-surface region having a compressive stress (CS) at the surface in a range from about 50 MPa to about 1,000 MPa or, in other embodiments, from about 500 MPa to about 2,000 MPa, and all ranges and subranges therebetween. The stress profile in the compressive stress layer may further include a first sub-region having a negative curvature and a second sub-region having a positive curvature. As used herein, the term "negative curvature" means that the stress profile in that region is concaved downward and "positive curvature" means that the stress profile in that region is concaved upward. In some embodiments, the absolute value of the negative curvature exceeds 10 MPa/(t(mm))$^2$ over a sub-region whose spatial extent ranges from about 2% to about 25% of the thickness (t). In some embodiments, the maximum absolute value of the negative curvature is between about 20 MPa/(t(mm))$^2$ and about 4,000 MPa/(t(mm))$^2$, and all ranges and subranges therebetween, for example, in some embodiments, from about 40 MPa/(t(mm))$^2$ to about 2000 MPa/(t(mm))$^2$, and, in still other embodiments, from about 80 MPa/(t(mm))$^2$ to about 1,000 MPa/(t(mm))$^2$. The stress profile in the second sub-region may, in some embodiments, include an inflection point. The physical center tension (CT) is in a range from about 40 MPa/(t(mm))$^{1/2}$ to about 150 MPa/(t(mm))$^{1/2}$ and all ranges and subranges therebetween, for example, in some embodiments, from about 42 MPa/(t(mm))$^{1/2}$ to about 100 MPa/(t(mm))$^{1/2}$.

The curvature of the stress profile is measured by identifying a portion of a stress profile that is of interest. A quadratic polynomial fit is applied to the portion of interest, with the resulting coefficient of the highest order term being the curvature of the portion of interest. The curvature will have units of MPa/mm$^2$ when the y-axis of the stress profile is measured in MPa and the x-axis of the stress profile is measured in mm. Additionally, when the x-axis of the stress profile is measured in μm, the curvature may be converted to units of MPa/mm$^2$ by the appropriate conversion factor.

In some cases the measured stress profile may include artifacts, or noise, as a result of the measurement process. In such cases, the artifacts are removed before determining the curvature of the stress profile to increase the accuracy of the calculated curvature. The artifacts may be removed by any appropriate processing method known in the art. For example, the artifacts may be removed by applying a low-pass filter to the stress profile or to the TE and TM index profiles (for example, when the IWKB method is used to determine the stress profile) from which the stress profile is extracted.

In some embodiments, the compressive stress within the compressive layer may decrease from a maximum compressive stress (CS) at the surface of the glass article to less than 50% of the maximum compressive stress within a depth of less than about 8 μm below the surface.

In some embodiments, the glass article is ion exchanged and annealed (i.e., subjected to a thermal diffusion step). In particular embodiments, the glass is ion exchanged in a single-step ion exchange (SIOX) process followed by an annealing process. In other embodiments, the ion exchange process is a two-step or dual ion exchange (DIOX) process comprising a first ion exchange step followed by an optional thermal anneal or diffusion step, which is then followed by a second ion exchange step in which the first ion exchange bath has a composition that is different from that of the second ion exchange bath. In some embodiments, the second ion exchange bath comprises at least 90% KNO$_3$ by weight and less than 10% NaNO$_3$ by weight. In other embodiments, the second ion exchange bath comprises at least 95 wt % KNO$_3$ with NaNO$_3$ accounting for the balance of the bath. In still other embodiments, the second ion exchange bath contains essentially 100% KNO$_3$ by weight. The second ion exchange step adds a compressive stress "spike"—i.e., a sharp increase in compressive stress—in the region immediately adjacent to the surface of the glass.

In those embodiments in which a single-step ion exchange process is used to strengthen the glass article, the article is ion exchanged at a temperature ranging from about 300° C. to about 500° C. in an ion exchange bath containing from about 25% to about 100% KNO$_3$ and 0% to about 75% NaNO$_3$ by weight. The ion exchange bath may include other materials, such as silicic acid or the like, to improve bath performance.

The glasses described herein are ion exchangeable alkali aluminosilicate glasses, which, in some embodiments, are formable by down-draw processes, such as slot-draw, or fusion-draw processes that are known in the art. In particular embodiments, such glasses may have a liquidus viscosity of at least about 100 kiloPoise (kP), or at least about 130 kP. In one embodiment, the alkali aluminosilicate glass comprises SiO$_2$, Al$_2$O$_3$, P$_2$O$_5$, and at least one alkali metal oxide (R$_2$O), wherein 0.75≤[(P$_2$O$_5$(mol %)+R$_2$O(mol %))/M$_2$O$_3$ (mol %)]≤1.2, where M$_2$O$_3$=Al$_2$O$_3$+B$_2$O$_3$. In some embodiments, the alkali aluminosilicate glass comprises or consists essentially of: from about 40 mol % to about 70 mol % SiO$_2$; from 0 mol % to about 28 mol % B$_2$O$_3$; from 0 mol % to about 28 mol % Al$_2$O$_3$; from about 1 mol % to about 14 mol % P$_2$O$_5$; and from about 12 mol % to about 16 mol % R$_2$O and, in certain embodiments, from about 40 to about 64 mol % SiO$_2$; from 0 mol % to about 8 mol % B$_2$O$_3$; from about 16 mol % to about 28 mol % Al$_2$O$_3$; from about 2 mol % to about 12 mol % P$_2$O$_5$; and from about 10 to about 16 mol % R$_2$O, or from about 12 mol % to about 16 mol % R$_2$O, where R$_2$O includes Na$_2$O. In some embodiments, 11 mol %≤M$_2$O$_3$≤30 mol %; in some embodiments, 13 mol %≤R$_x$O≤30 mol %, where R$_x$O is the sum of alkali metal oxides, alkaline earth metal oxides, and transition metal monoxides present in the glass. In some embodiments, the glass is lithium-free. In other embodiments, the glass may comprise up to about 10 mol % Li$_2$O, or up to about 7 mol % Li$_2$O. These glasses are described in U.S. patent application Ser. No. 13/305,271, granted as U.S. Pat. No. 9,346,703, entitled "Ion Exchangeable Glass with Deep Compressive Layer and High Damage Threshold," filed Nov. 28, 2011, by Dana Craig Bookbinder et al. and claiming priority from U.S. Provisional Patent Application No. 61/417,941, filed on Nov. 30, 2010, and having the same title, the contents of which are incorporated herein by reference in their entirety.

In certain embodiments, the alkali aluminosilicate glass comprises at least about 2 mol % $P_2O_5$, or at least about 4 mol % $P_2O_5$, wherein $(M_2O_3(\text{mol }\%)/R_xO(\text{mol }\%))<1$, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass is lithium-free and comprises or consists essentially of from about 40 mol % to about 70 mol % $SiO_2$; from about 11 mol % to about 25 mol % $Al_2O_3$; from about 2 mol % $P_2O_5$, or from about 4 mol % to about 15 mol % $P_2O_5$; from about 10 mol % $Na_2O$, or from about 13 mol % to about 25 mol % $Na_2O$; from about 13 to about 30 mol % $R_xO$, where $R_xO$ is the sum of the alkali metal oxides, alkaline earth metal oxides, and transition metal monoxides present in the glass; from about 11 mol % to about 30 mol % $M_2O_3$, where $M_2O_3=Al_2O_3+B_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; wherein $1.3<[(P_2O_5+R_2O)/M_2O_3]\leq2.3$, where $R_2O$ is the sum of monovalent cation oxides present in the glass. In some embodiments, the glass is lithium-free. In other embodiments, the glass may comprise up to about 10 mol % $Li_2O$, or up to about 7 mol % $Li_2O$. The glass is described in U.S. Pat. No. 9,156,724 by Timothy M. Gross, entitled "Ion Exchangeable Glass with High Crack Initiation Threshold," filed Nov. 15, 2012, and U.S. Pat. No. 8,756,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

In other embodiments, the alkali aluminosilicate glass comprises $SiO_2$, $Al_2O_3$, $P_2O_5$, and greater than about 1 mol % $K_2O$, wherein the glass has a coefficient of thermal expansion (CTE) of at least about $90\times10^{-7\circ}$ $C.^{-1}$. In some embodiments, the glass comprises or consists essentially of: from about 57 mol % to about 75 mol % $SiO_2$ (i.e., 57 mol % $\leq SiO_2 \leq 75$ mol %); from about 6 mol % to about 17 mol % $Al_2O_3$ (i.e., 6 mol % $\leq Al_2O_3 \leq 17$ mol %); from about 2 mol % to about 7 mol % $P_2O_5$ (i.e., 2 mol % $\leq P_2O_5 \leq 7$ mol %); from about 14 mol % to about 17 mol % $Na_2O$ (i.e., 14 mol % $\leq Na_2O \leq 17$ mol %); and greater than about 1 mol % to about 5 mol % $K_2O$ (i.e., 1 mol % $< K_2O \leq 5$ mol %). In some embodiments, the glass comprises or consists essentially of or comprises: from about 57 mol % to about 59 mol % $SiO_2$ (i.e., 57 mol % $\leq SiO_2 \leq 59$ mol %); from about 14 mol % to about 17 mol % $Al_2O_3$ (i.e., 14 mol % $\leq Al_2O_3 \leq 17$ mol %); from about 6 mol % to about 7 mol % $P_2O_5$ (i.e., 6 mol % $\leq P_2O_5 \leq 7$ mol %); from about 16 mol % to about 17 mol % $Na_2O$ (i.e., 16 mol % $\leq Na_2O \leq 17$ mol %); and greater than about 1 mol % to about 5 mol % $K_2O$ (i.e., 1 mol % $< K_2O \leq 5$ mol %). In certain embodiments, the glass further comprises up to about 2 mol % MgO (i.e., 0 mol % $\leq$ MgO $\leq 2$ mol %) and/or up to about 1 mol % CaO (i.e., 0 mol % $\leq$ CaO $\leq 1$ mol %). In some embodiments, the glass is substantially free of MgO. In some embodiments, the glass is substantially free of $B_2O_3$ and/or lithium or $Li_2O$. These glasses are described in U.S. patent application Ser. No. 14/465,888, published as U.S. Patent Application Publication No. 2015/0064472, entitled "Damage Resistant Glass with High Coefficient of Thermal Expansion," filed Aug. 22, 2014, by Timothy M. Gross et al. and claiming priority from U.S. Provisional Patent Application No. 61/870,301, filed on Aug. 27, 2013, and having the same title, the contents of which are incorporated herein by reference in their entirety.

In another aspect, a method of strengthening a glass having a thickness (t) and achieving the stress profiles described herein is provided. The method comprises immersing the glass in an ion exchange bath comprising alkali cations (e.g., $K^+$) that are different from alkali cations (e.g., $Na^+$, $Li^+$) that are present in the glass, and replacing alkali cations within the glass with the alkali cations from the ion exchange bath. The ion exchange forms a compressive layer extending from the surface of the glass to a first depth of compression (DOC1), where the compressive layer is under a first compressive stress (CS1).

The cations from the ion exchange bath are then diffused from the surface of the glass to the center of the glass at a depth of t/2. In some embodiments, this is achieved by allowing the ion exchange to continue for longer periods (e.g., 16 hours or more at 460° C.), and/or, in some embodiments, by a subsequent thermal diffusion (heating) step. The cations are allowed to diffuse from opposite surfaces of the glass until the diffused cations meet at the center of the glass. The diffusion step in some embodiments results in a decrease in the compressive stress at the surface to a second compressive stress (CS2) and an increase in the depth of compression to a second depth of compression (DOC2) such that CS2≤CS1 and DOC2>DOC1.

The thermal diffusion step, in some embodiments, includes heating the glass to a temperature in a range from about 400° C. to about 500° C. for times ranging from 0.5 hour to 40 hours.

In some embodiments, the method may further include a second ion exchange following either the first ion exchange or the thermal diffusion step. As previously described hereinabove, the second ion exchange bath has a composition that is different from that of the first ion exchange bath. In some embodiments, the second ion exchange bath comprises at least 90% $KNO_3$ by weight and less than 10% $NaNO_3$ by weight. In other embodiments, the second ion exchange bath comprises at least 95 wt % $KNO_3$ with $NaNO_3$ accounting for the balance of the bath. In still other embodiments, the second ion exchange bath contains essentially 100% $KNO_3$ by weight. The second ion exchange step adds a compressive stress "spike"—i.e., a sharp increase in compressive stress—in the region immediately adjacent to the surface of the glass, creating a third compressive stress (CS3) at the surface, where CS3>CS1.

Under ideal conditions, the shape and values of the stress profile in an ion exchanged glass should obey a classic diffusion equation. The solution for this equation indicates that, in the case of a single boundary through which the ions diffuse without limit, the stress profile should be a complementary error function (erfc(x)). As used herein, the terms "error function" and "erf" refer to the function that is twice the integral of a normalized Gaussian function between 0 and $$\frac{x}{\sigma\sqrt{2}}.$$

The terms "complementary error function" and "erfc" are equal to one minus the error function; i.e., erfc(x)=1−erf(x).

For a bounded case—e.g., where ions diffuse from opposite surfaces to the center of the glass—diffusion of strengthening cations follows a complementary error function until the ions meet at the center of the glass, after which the whole diffusion profile may be better approximated by a parabolic shape profile for the ionic distribution. The stress profile is directly related to the ionic distribution inside the glass. The stress profile should therefore be similar to the ionic distribution, regardless of whether the distribution of ions according to a complementary error function or a parabolic function.

A significant divergence between expected and observed stress profiles may occur for certain glasses. This is likely due to stress relaxation present in the glass and additional annealing effects. Modeled and measured stress profiles of ion exchanged glass having a nominal composition of about 57 mol % $SiO_2$, 0 mol % $B_2O_3$, about 17 mol % $Al_2O_3$, about 7% $P_2O_5$, about 17 mol % $Na_2O$, about 0.02 mol % $K_2O$, and about 3 mol % MgO and a thickness of 800 μm are plotted over a wide range of diffusion times in FIG. 2. The glass was ion exchanged at 460° C. in a molten salt bath of 20 wt % $NaNO_3$/80 wt % $KNO_3$ for times ranging from 16 hours to about 184 hours. The modeled stress profiles were for diffusion/ion exchange times of 16 hours, 40 hours, 64 hours, 135 hours, 159.25 hours, and 183.53 hours. The stress profiles were also measured by SCALP (polarimetry) for a diffusion/ion exchange time of 183.43 hours and by IWKB for diffusion/ion exchange times of 16 hours, 40 hours, 64 hours, and 159.25 hours. For diffusion times of 16 hours and 40 hours, the modeled stress profiles (dashed lines a and b, respectively, in FIG. 2) are still based on a complementary error function. For longer diffusion times (64, 135, 159.25, and 183.53 hours), the diffused ions have met at the center of the glass sample, leading in theory to a parabolic-like profile. In practice however, stress relaxation in the glass and/or additional thermal annealing cause the real measured stresses to diverge from the theoretical predicted values. In this case, an S-shape stress profile is generated. The degree of divergence between the theoretical and experimental stress profiles will depend on the particular characteristics of the glass and processing conditions. Some glasses will be more susceptible than other glasses to variations under the same process conditions. As seen in FIG. 3, significant differences start to occur for this particular glass composition for ion exchange at 460° C. for times of 16 hours or greater.

Figure 2:
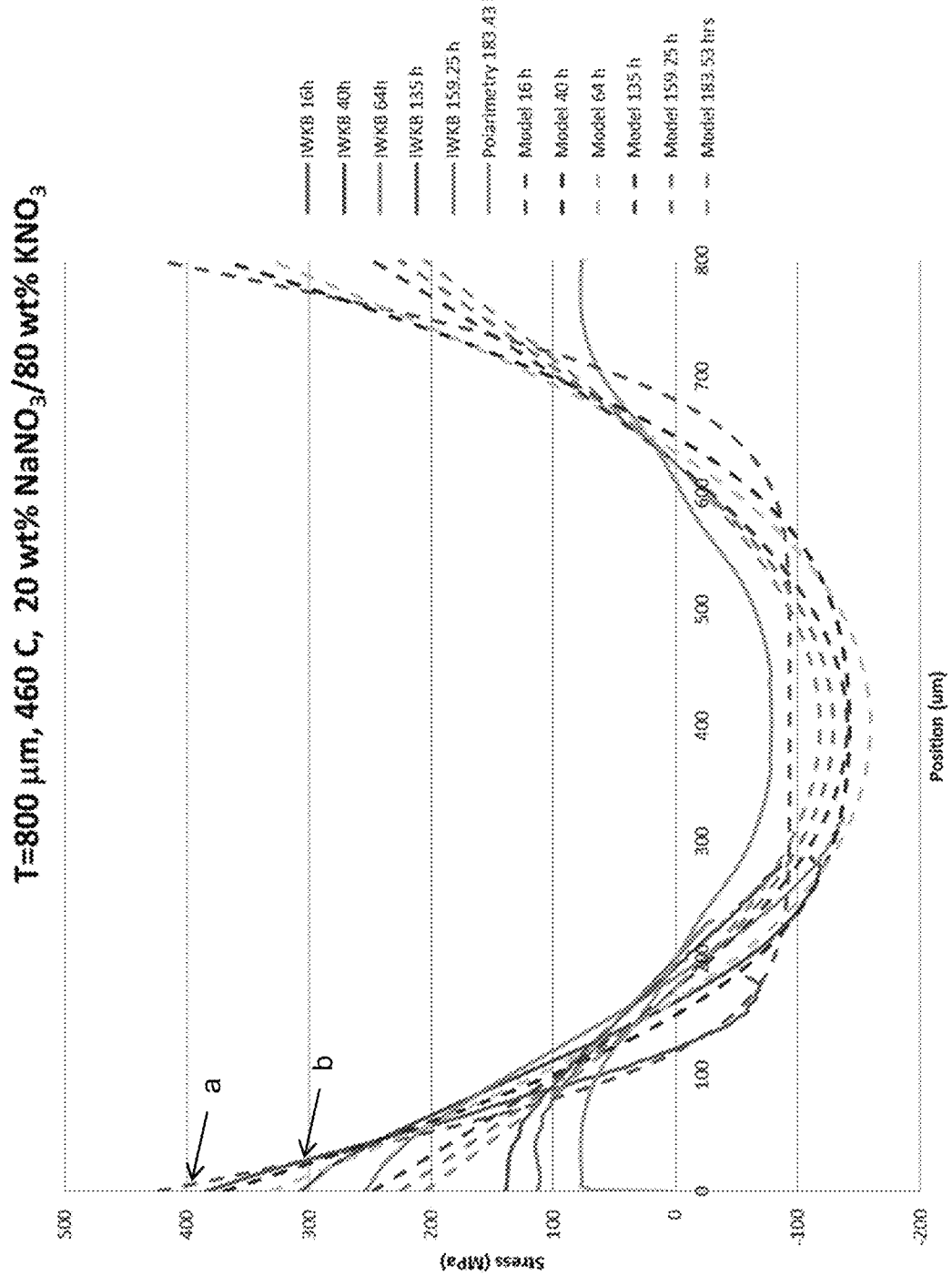
FIG. 2 is a plot of modeled and measured stress profiles of ion exchanged glasses having a thickness of 800 μm as a function of diffusion time.
Figure 3:
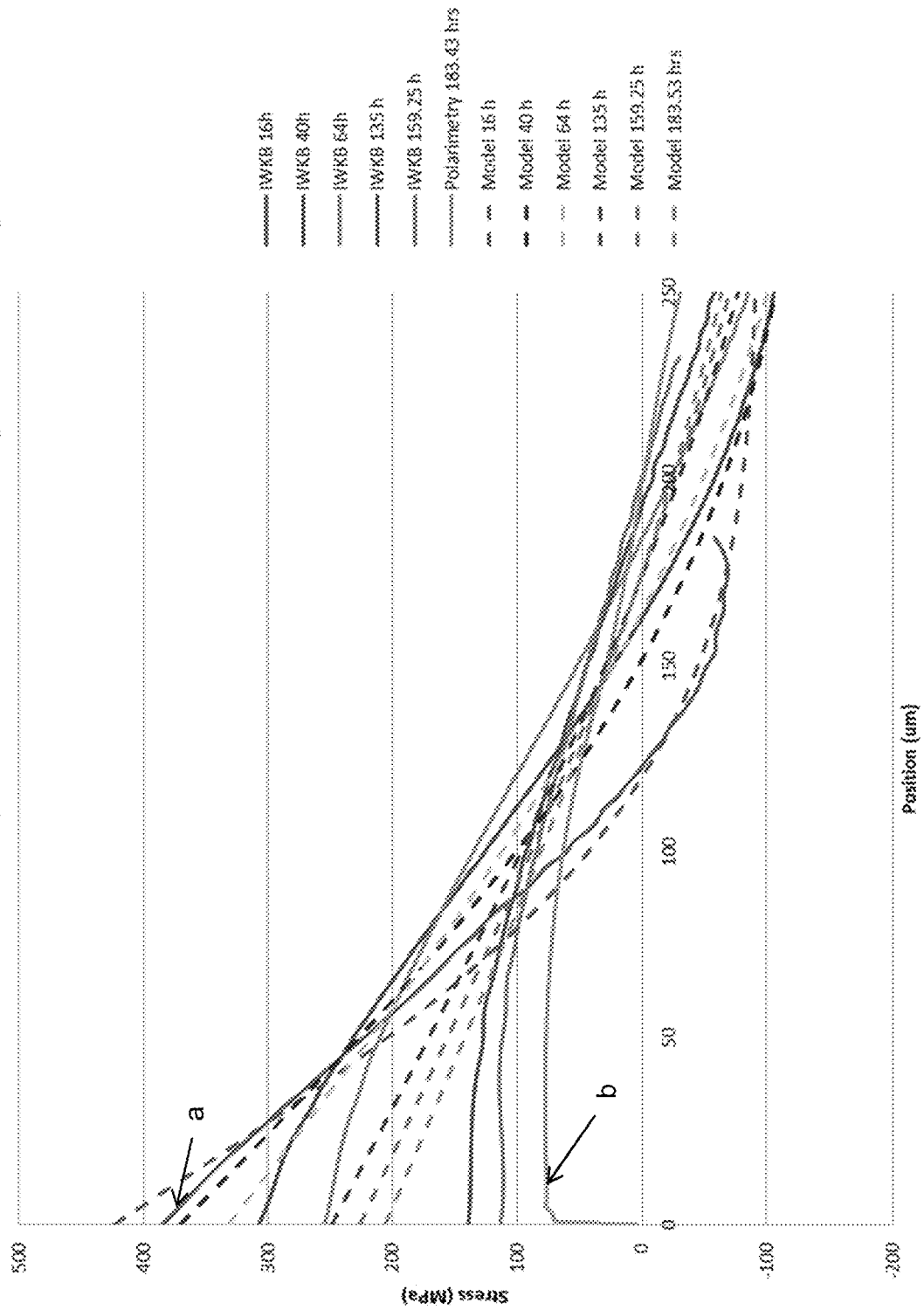
FIG. 3 is a detailed view of the stress profile in FIG. 2.

A more detailed view of the stress profile in FIG. 2 is shown in FIG. 3. The rounding effect observed for the compressive stress (CS) profile at the surface may be on the order of a few percent of the target CS after 16 hours of diffusion/ion exchange at 460° C. (a in FIG. 3) to greater than 100% of the target after 183.53 hours of diffusion/ion exchange at 460° C. (b in FIG. 3). The progression of the rounding effect is clearly observed as the diffusion time increases. Also, the slope of the stress profile changes depending on the time and temperature of ion exchange: the second derivative of the stress profile changes, creating an inflection point in the stress profile and a decrease in the absolute value of slope. The inflection point will happen somewhere in the compressive region of the stress profile between the surface of the glass and the depth of compression (DOC), regardless whether the stress profile is a complementary error function (erfc(x)) or is parabolic.

Figure 4:
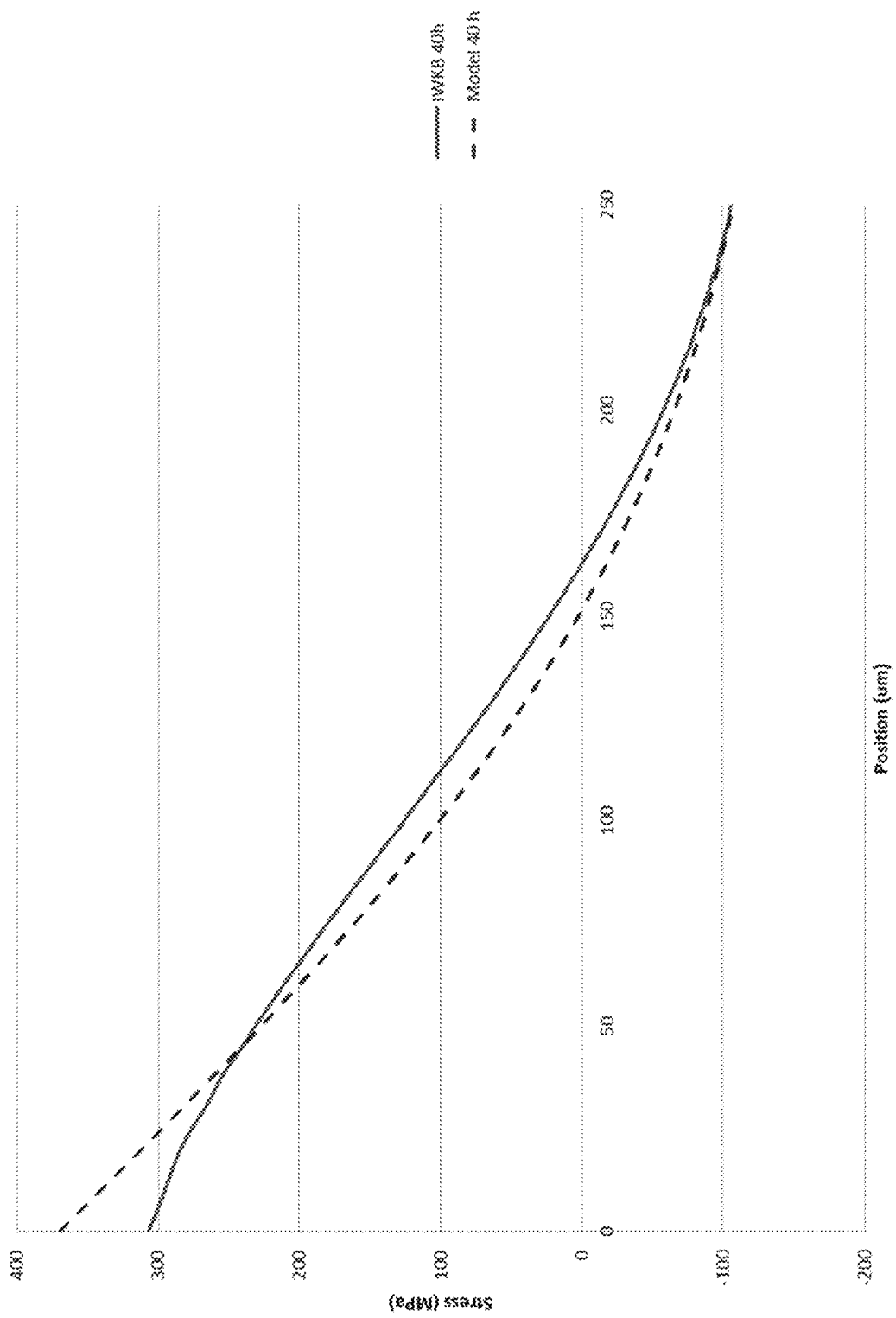
FIG. 4 is a plot of modeled and measured stress profiles for glasses ion exchanged for 40 hours at 460° C.

Further details of modeled (dashed line) and experimentally determined (solid line) stress profiles for the case of 40 hour diffusion/ion exchange at 460° C. are shown in FIG. 4. Here, the modeled stress profile is still a complementary error function erfc(x), having a deep depth of compression (DOC), which is the position at which the stress is zero inside the sample. The profiles shown in FIG. 4 demonstrate that error-function stress profiles do not include S-shaped profiles of the type described herein.

Figure 5:
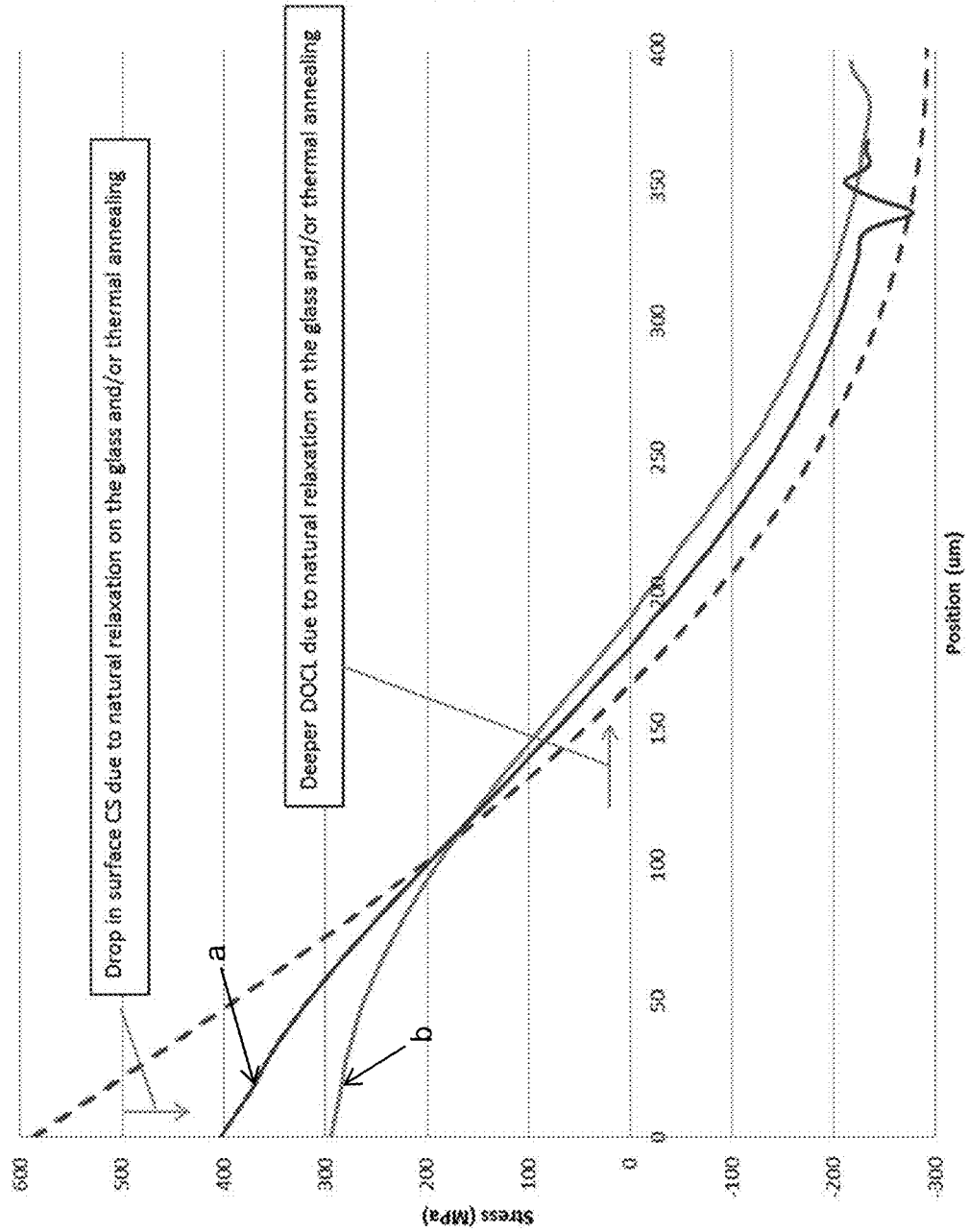
FIG. 5 is a plot of modeled and measured stress profiles for glass that was ion exchanged at 460° C. for 60 hours and then ion exchanged at 490° C. for 32 hours.

The S-shaped stress profile may occur in instances when glass is ion exchanged in a bath that is "poisoned" to a particular level (e.g., comprising greater than 30 wt % $NaNO_3$). Modeled (dashed lines) and measured (solid lines) stress profiles for 800 μm thick glass having a nominal composition of about 57 mol % $SiO_2$, 0 mol % $B_2O_3$, about 17 mol % $Al_2O_3$, about 7% $P_2O_5$, about 17 mol % $Na_2O$, about 0.02 mol % $K_2O$, and about 3 mol % MgO are shown in FIG. 5. The glass was ion exchanged (IOX) in a bath of pure (100% by weight) $KNO_3$ for different temperatures and times (IOX at 460° C. for 60 hours and IOX at 490° C. for 32 hours).

The modeled stress profiles directly overlap each other, and thus show that the expected diffusion profile based on a diffusion length of $2(D \times Time)^{1/2}$, where D is the diffusion coefficient at a certain temperature, is basically the same for the different cases investigated. Therefore, one would expect that the diffusion at 460° C. for 60 hours (line a in FIG. 5) and the diffusion at 490° C. for 32 hours (line b in FIG. 5) would produce the same stress profile. A modeled complementary error function erfc(x) stress profile is shown as a dashed line in FIG. 5 for comparison purposes. In practice, however, the combination of time and temperature leads to a different level of relaxation in the glass and results in different stress profiles. This can be observed by the measurements performed using the IWKB treatment for these samples, which shows that the samples have different stress profiles, surface compressive stresses (CS), and depths of compression (DOC). The DOC values determined for both samples shown in FIG. 5 are greater than the theoretical value of about 21% of the thickness (0.21t). In the case of glass ion exchanged at 490° C. for 32 hours, the depth of compression (DOC) is 25% of the thickness (0.25t). Despite being frangible, both samples shown in FIG. 5 demonstrated excellent performance when dropped onto 30 grit sandpaper, surviving average drop heights of 148 cm (IOX at 490° C.) and 152 cm (IOX at 460° C.). Since the ions diffusing from opposite surfaces of the glass met at the center of these samples, the samples were expected to have a parabolic stress profile, but the resulting stress profiles are S-shaped. Although diffusion theory would predict that the absolute value of the slope would increase or stay approximately constant, the absolute values of the slope of the observed stress profiles begin to decrease at a depth of about 120 μm. This inflection or reduction in slope towards the surface is one of the main characteristics of these S-shaped stress profiles.

Energy (surface, stored, total), physical center tension (CT), surface compressive stress (CS), depth of compression (DOC), and results of mechanical testing (4-point bend testing, abraded ring-on-ring (AROR), and drop onto 30 grit sandpaper) for the samples shown in FIG. 5 are listed in Table 1.

TABLE 1

Stress profile parameters and mechanical performance measured for samples shown in FIG. 5.

|  | IOX at 490° C. 32 hours | IOX at 460° C. 60 hours |
|---|---|---|
| Energy surface (J/m$^2$) | 929.28 | 1329.45 |
| Energy stored (J/m$^2$) | 929.28 | 653.99 |
| Energy total (J/m$^2$) | 1858.57 | 1983.44 |
| CT (MPa) | 217 | 233 |
| CS (MPa) | 294 | 402 |
| DOC (μm) | 191 | 179 |
| 4-point bend (MPa) | 247 | |
| AROR 45 psi (kgf) | 58 | |
| Drop onto 30 grit sandpaper (cm avg) | 148 | 152 |

The strengthened glass articles described herein also demonstrate improved surface strength when subjected to abraded ring-on-ring (AROR) testing. The strength of a material is defined as the stress at which fracture occurs. The abraded ring-on-ring test is a surface strength measurement for testing flat glass specimens, and ASTM C1499-09 (2013), entitled "Standard Test Method for Monotonic Equibiaxial Flexural Strength of Advanced Ceramics at Ambient Temperature," serves as the basis for the ring-on-ring abraded ROR test methodology described herein. The contents of ASTM C1499-09 are incorporated herein by reference in their entirety. The glass specimen was abraded prior to ring-on-ring testing with 90 grit silicon carbide (SiC) particles that are delivered to the glass sample using the method and apparatus described in Annex A2, entitled "abrasion Procedures," of ASTM C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass sample was abraded as described in ASTM C158-02, Annex 2, to normalize and/or control the surface defect condition of the sample using the apparatus shown in Figure A2.1 of ASTM C158-02. The abrasive material is sandblasted onto the sample surface at a load of 15 psi using an air pressure of 45 psi. After air flow was established, 5 cm$^3$ of abrasive material was dumped into a funnel and the sample was sandblasted for 5 seconds after introduction of the abrasive material.

Figure 6:
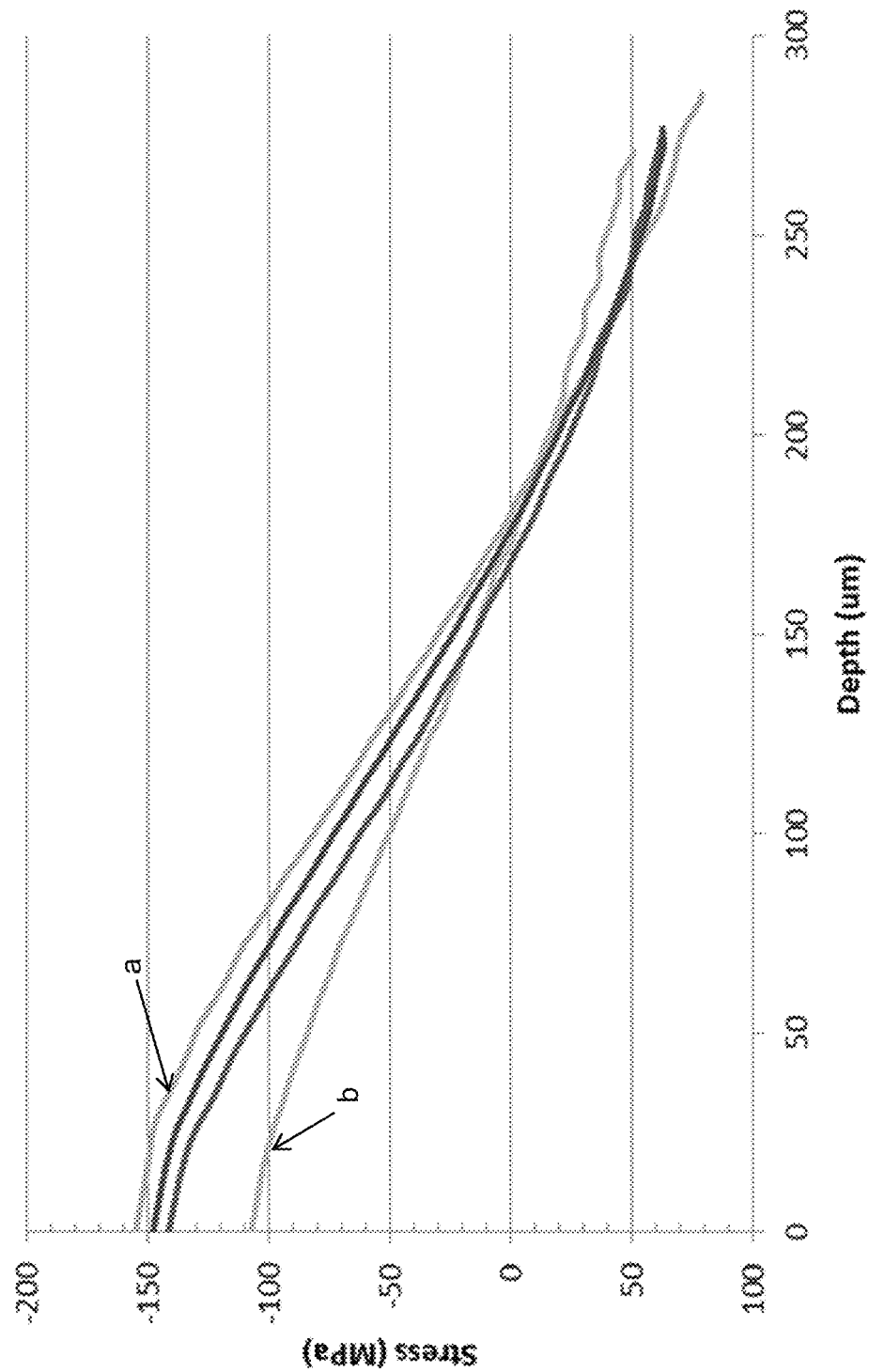
FIG. 6 is a plot of stress profiles measured for glass ion exchanged at 460° C. for 28 hours in mixed $KNO_3/NaNO_3$ baths of different compositions.
Figure 7:
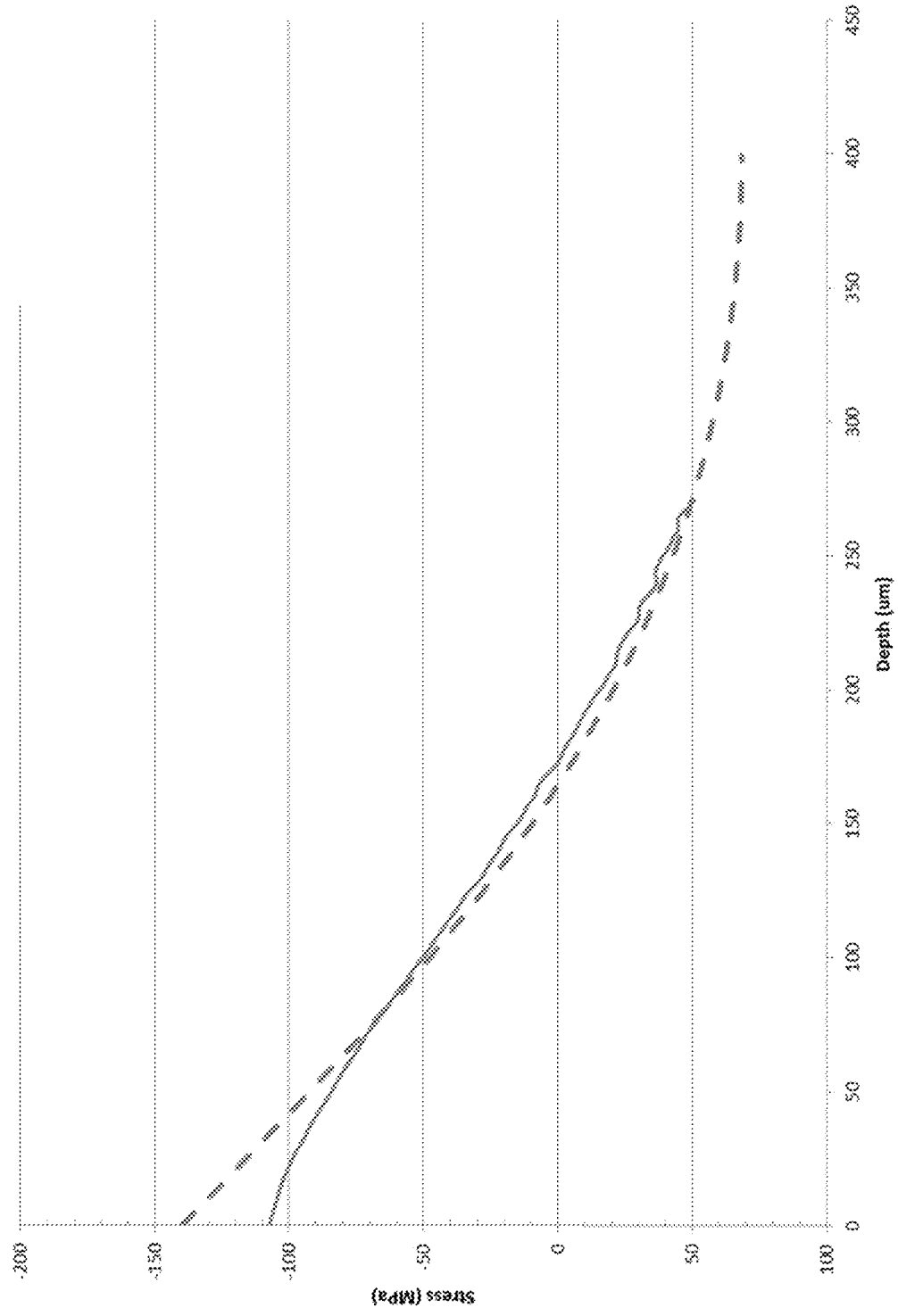
FIG. 7 is a plot of the modeled stress profile and measured stress profile obtained for glass ion exchanged at 460° C. for 28 hours in a bath containing 41 wt % $NaNO_3$.

Stress profiles measured for a different ion exchangeable alkali aluminosilicate glass, which is described in U.S. patent application Ser. No. 14/465,888, published as U.S. Patent Application Publication No. 2015/0064472, which was ion exchanged at 460° C. for 28 hours, are shown in FIG. 6. Ion exchange was conducted in a mixed KNO$_3$/NaNO$_3$ bath. The amount of NaNO$_3$ in the bath was increased from 25 wt % (line a in FIG. 6) to 30 wt % (line below line a in FIG. 6) to 35 wt % (line above line b in FIG. 6), and finally, to 41 wt % (line b in FIG. 6), while the amount of KNO$_3$ was decreased between 75 wt % to 70 wt %, to 65 wt %, and, finally, to 59 wt %. The stress profile obtained for glass ion exchanged at 460° C. for 28 hours in a bath containing 41 wt % NaNO$_3$ (solid line) and the modeled stress profile (dashed line) are shown in FIG. 7. Because the ions diffusing from opposite surfaces of the glass had met at the center of the sample, these samples were expected to have parabolic stress profiles. However, the experimentally measured stress profiles shown in FIGS. 6 and 7 are S-shaped. Although diffusion theory would predict that the absolute value of the slope would increase or stay approximately constant, the absolute values of the slope of the observed stress profiles begin to decrease at a depth of about 120 μm. This inflection or reduction in slope towards the surface is one of the main characteristics of these S-shaped stress profiles.

Figure 8:
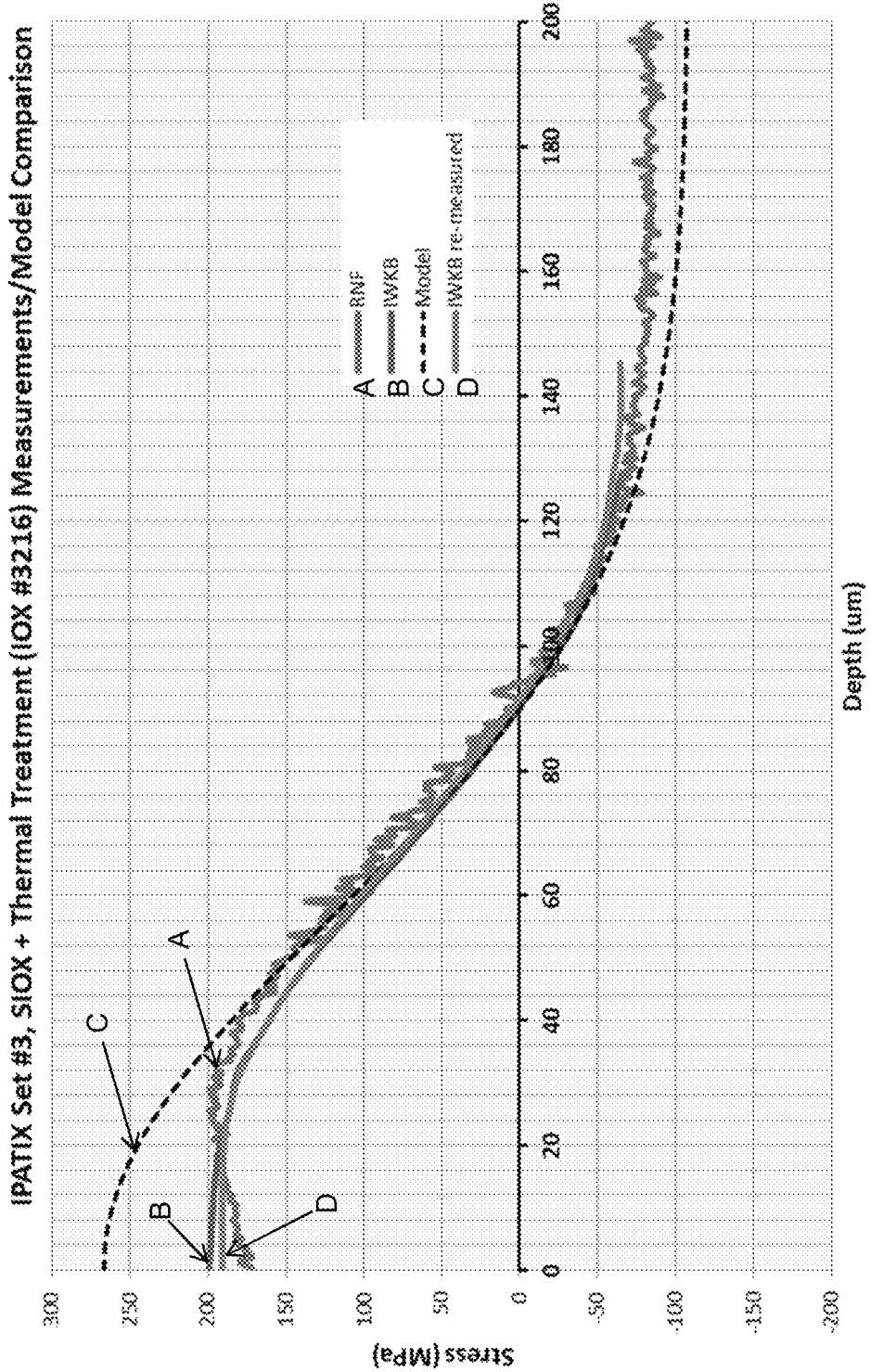
FIG. 8 is a plot of modeled and measured stress profiles of a 0.5 mm thick glass ion exchanged for 7 hours at 410° C. in a bath of 100 wt % $KNO_3$, and then thermally diffused by heating for 5 hours at 450° C.
Figure 9:
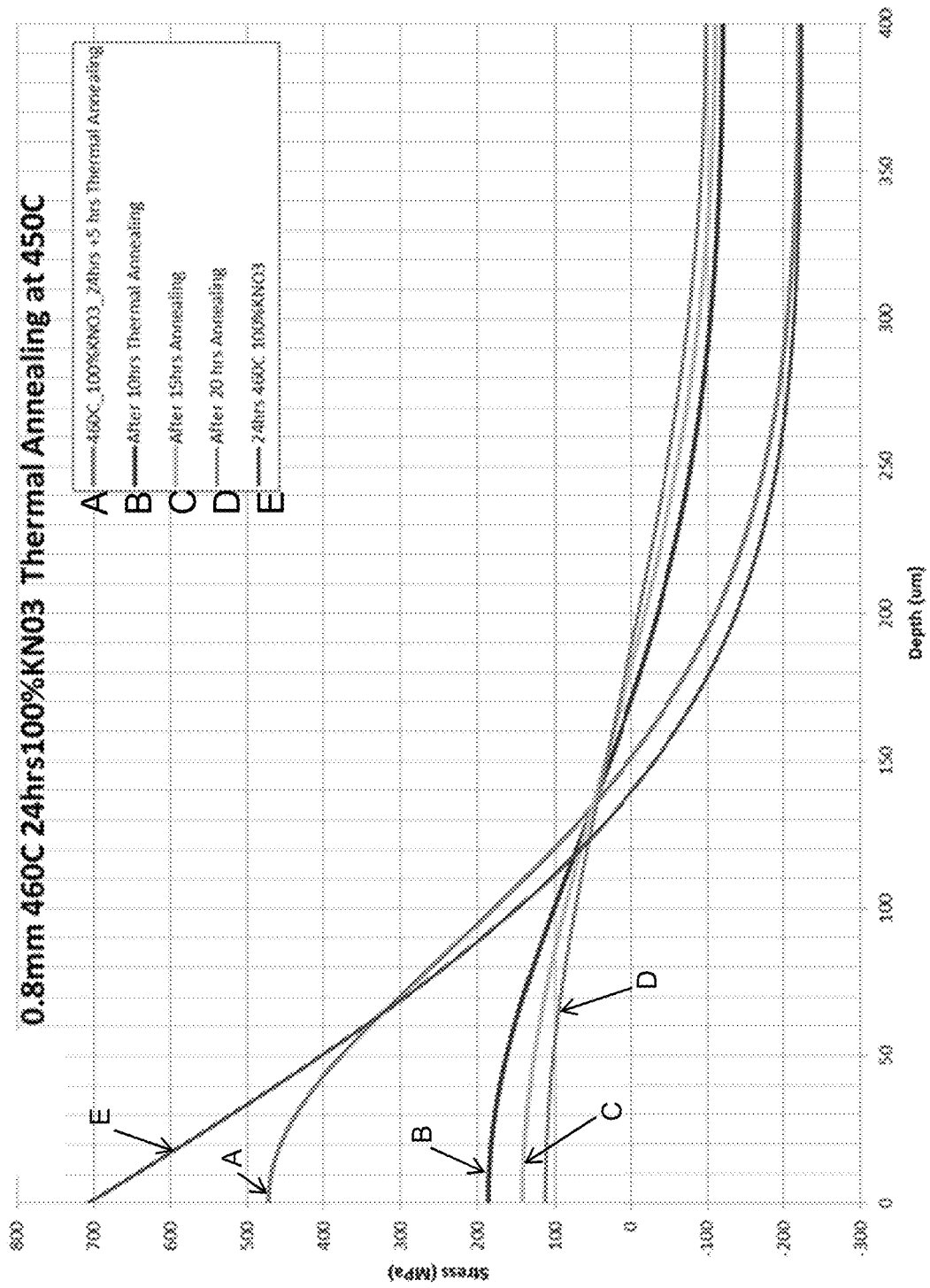
FIG. 9 is a plot of modeled and measured stress profiles of a 0.5 mm thick glass ion exchanged for 24 hours at 460° C. in a bath of pure (100 wt %) $KNO_3$ and then thermally diffused by heating at 450° C. for times ranging from 5 hours to 24 hours.
Figure 10:
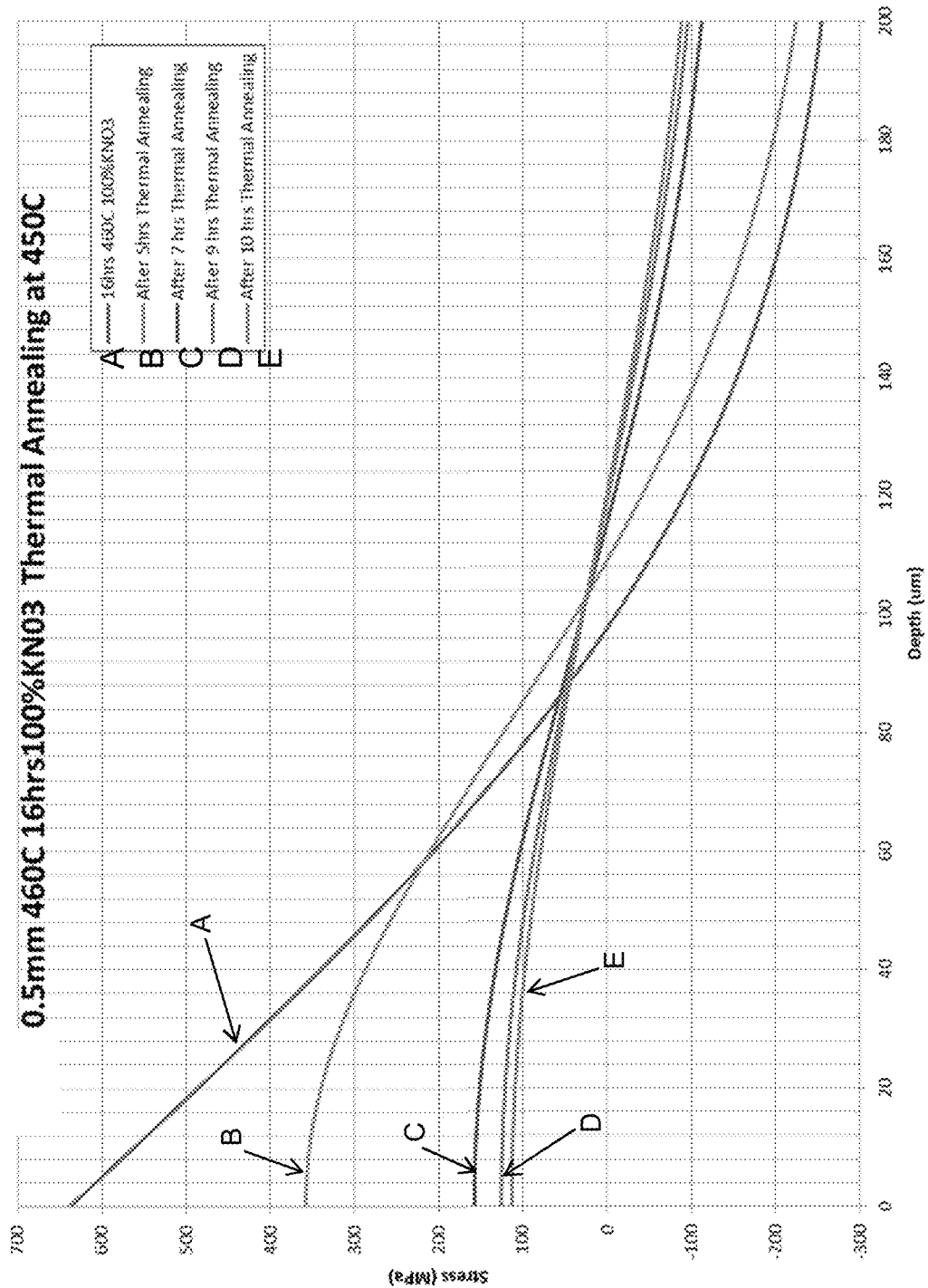
FIG. 10 is a plot of modeled and measured stress profiles of a 0.8 mm thick glass ion exchanged for 24 hours at 460° C. in a bath of pure (100 wt %) $KNO_3$ and then thermally diffused by heating at 450° C. for times ranging from 5 hours to 24 hours.

Other examples of S-shape stress profiles are shown in FIGS. 8, 9, and 10. In FIG. 8, modeled (dashed line) and measured stress profiles (solid lines) of a glass having a thickness of 500 μm and a nominal composition of about 57 mol % SiO$_2$, 0 mol % B$_2$O$_3$, about 17 mol % Al$_2$O$_3$, about 7% P$_2$O$_5$, about 17 mol % Na$_2$O, about 0.02 mol % K$_2$O, and about 3 mol % MgO. The glass was ion exchanged for 7 hours at 410° C. in a bath of 100 wt % KNO$_3$, and then thermally diffused by heating for 5 hours at 450° C. to achieve a depth of compression (DOC)/depth of compressive layer (DOCL) of 20% of the glass thickness (0.2t). These samples were expected to have a stress profile evolving from an error-function profile with some level of thermal relaxation at the surface to develop a parabolic profile. In this particular example, the combination of thermal annealing and additional stress relaxation in the glass resulted in a very pronounced difference from what was expected from diffusion theory, and enabled deeper depths of compression to be achieved. FIGS. 9 and 10, illustrate how the process of ion exchange followed by thermal diffusion can be used to create S-shape stress profiles having depths of compression of greater than 21% of the glass thickness. The examples shown in FIGS. 9 and 10 have the same composition as those shown in FIG. 8. Sample thicknesses of 0.5 mm (500 μm) and 0.8 mm (800 μm) were studied. However, the increase of depth of compression (DOC) to values greater than 21% of the glass thickness may be extended well beyond these illustrative examples to glasses having thicknesses ranging from 0.1 mm (100 μm) to 2 mm.

Modeled stress profiles for glass having thicknesses of 0.8 mm and 0.5 mm produced by a combination of ion exchange and thermal diffusion are shown in FIGS. 9 and 10, respectively. The glass was ion exchanged for 24 hours at 460° C. in a bath of pure (100 wt %) KNO$_3$ and thermal diffusion by heating at 450° C. for times ranging from 5 hours to 24 hours. As previously demonstrated, additional stress relaxation is expected to take place, thus enabling the depth of compression (DOC) to extend to deeper depths within the glass and further accentuating the S-shape of the stress profile and reducing compressive stress at the glass surface. Based on the modeling shown in FIGS. 8-10, it is possible to predict that, after 10 hours of thermal annealing, the compressive stress will be reduced and the depth of compression DOC/depth of compressive layer DOCL will be further increased to well above 25% of the glass thickness.

Figure 11:
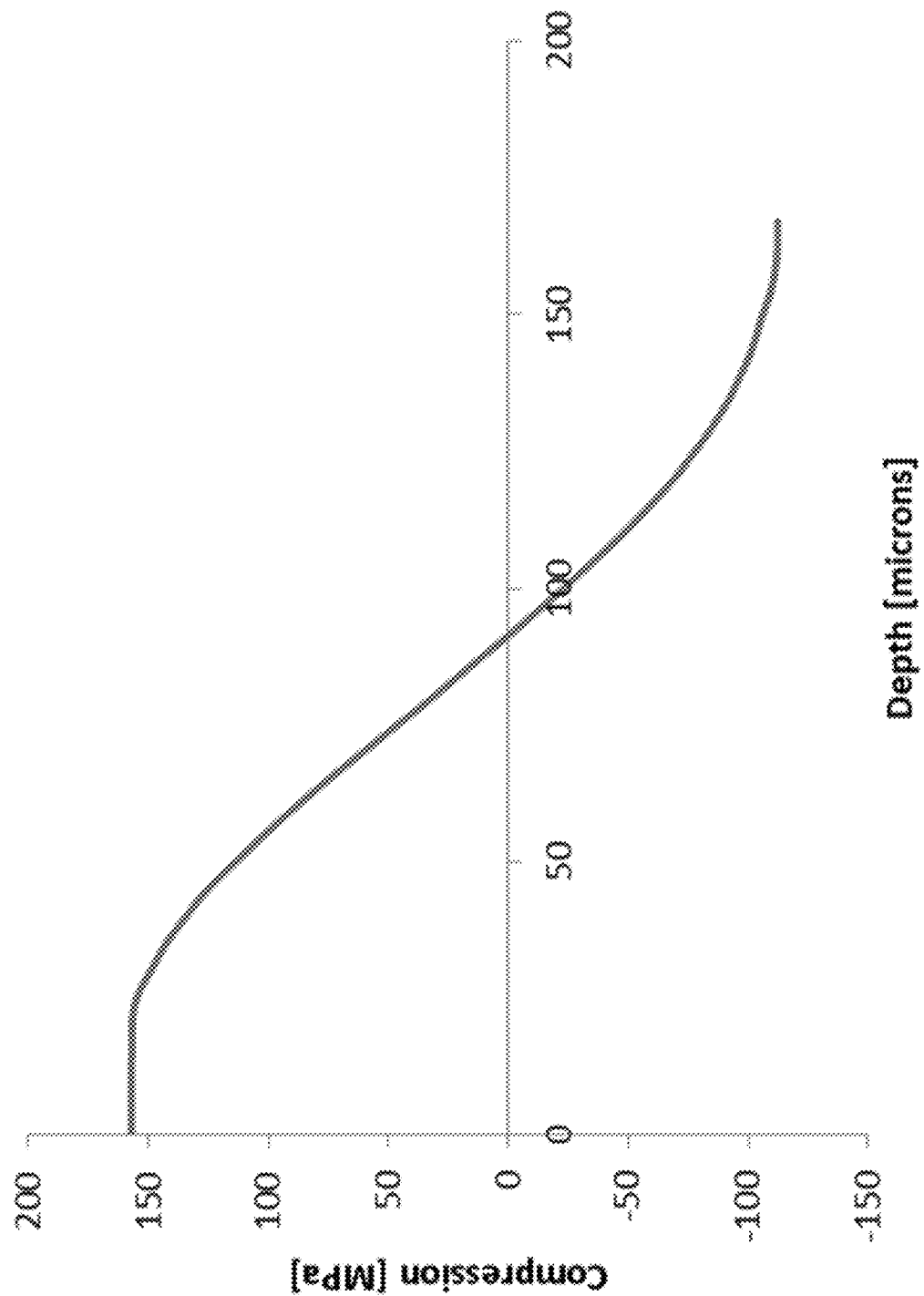
FIG. 11 is a plot of an S-shaped profile obtained for 0.4 mm thick glass ion exchanged for 11.5 hours at 430° C. in a bath containing 17 wt % $NaNO_3$ and 83 wt % $KNO_3$, and then thermally treated at 430° C. for 13.07 hours.

Strengthened glasses having S-shaped stress profiles appear to have a higher frangibility limit (i.e., the physical center tension (CT) above which explosive fragmentation and ejection of small fragment occurs upon insult or impact) than glasses having other profiles having a comparable depth of compression (DOC). An example of an S-shaped profile obtained for 0.4 mm thick non-frangible glass having a nominal composition of about 57 mol % SiO$_2$, 0 mol % B$_2$O$_3$, about 17 mol % Al$_2$O$_3$, about 7% P$_2$O$_5$, about 17 mol % Na$_2$O, about 0.02 mol % K$_2$O, and about 3 mol % MgO is shown in FIG. 11. The glass was ion exchanged for 11.5 hours at 430° C. in a bath containing 17 wt % NaNO$_3$ and 83 wt % KNO$_3$, and then subjected to a thermal treatment at 430° C. for 13.07 hours. The ion exchanged and heat treated sample was non-frangible even though the center tension (CT) of the glass was 117 MPa, which is higher than any previously value measured for a non-frangible glass of 0.4 mm thickness. Accordingly, in one embodiment, the stress profile of the strengthened glass article has a region of negative curvature of the compressive stress in the compression region, with a peak curvature and a physical center tension (CT) that is generally higher than that typically observed for chemically strengthened glass. The absolute value of the peak curvature is in a range from 20 MPa/t$^2$ to 4000 MPa/t$^2$, where t is the thickness of the glass, expressed in millimeters. The region where the absolute value of the negative curvature exceeds 10 MPa/t$^2$ is in a range from about 2% of the thickness to about 25% of the thickness t of the glass article, and, in some embodiments, is in a range from about 2.5% to about 20% of the thickness t.

A glass article with a thickness of 0.4 mm was subjected to a first ion exchange, a thermal treatment, and a second ion exchange to form a S-shaped stress profile in the glass article. The glass article included a glass containing about 57 wt % $SiO_2$, about 16 wt % $Al_2O_3$, about 17 wt % $Na_2O$, about 3 wt % MgO, and about 7 wt % $P_2O_5$. The first ion exchange was carried out by immersing the glass article for 11 hours in a bath containing 38 wt % $NaNO_3$ and 62 wt % $KNO_3$ at a temperature of 450° C. The ion exchanged glass article was then subjected to thermal treatment for 6.5 hours at 420° C. The subsequent ion exchange was carried out by immersing the thermally treated glass article for 11 minutes in a bath containing 0.5 wt % $NaNO_3$ and 99.5 wt % $KNO_3$ at a temperature of 390° C.

Figure 15:
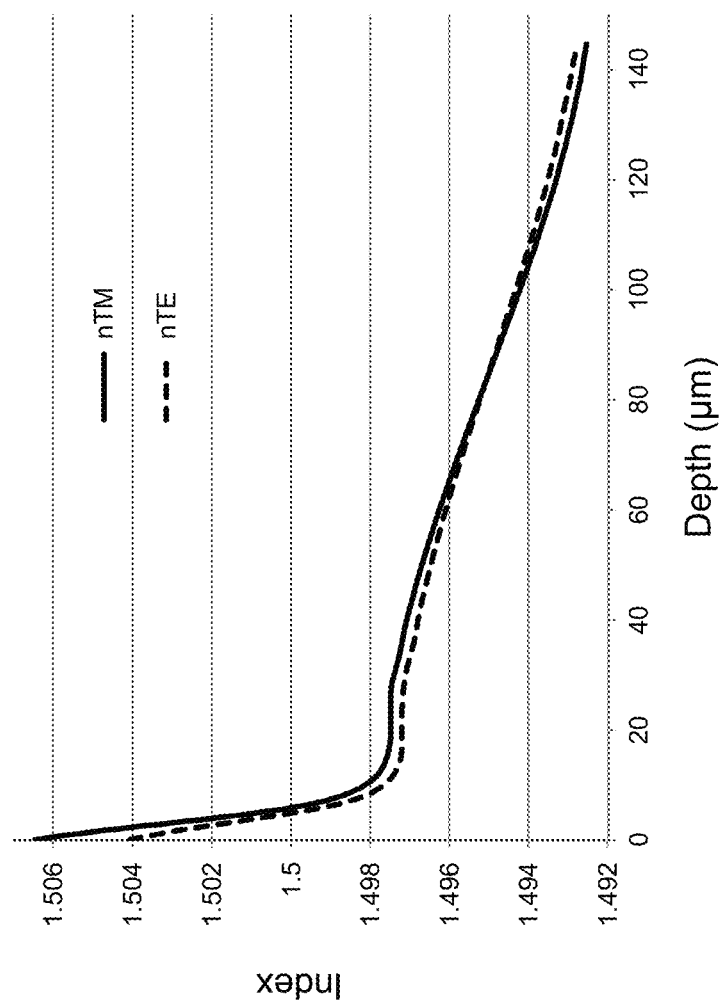
FIG. 15 is a plot of the index profile for transverse magnetic and transverse electric guided light obtained for 0.4 mm glass ion exchanged for 11 hours at 450° C. in a bath containing 38 wt % NaNO$_3$ and 62 wt % KNO$_3$, heat treated for 6.5 hours at 420° C., and then ion exchanged for 11 minutes at 390° C. in a bath containing 0.5 wt % NaNO$_3$ and 99.5 wt % KNO$_3$.
Figure 16:
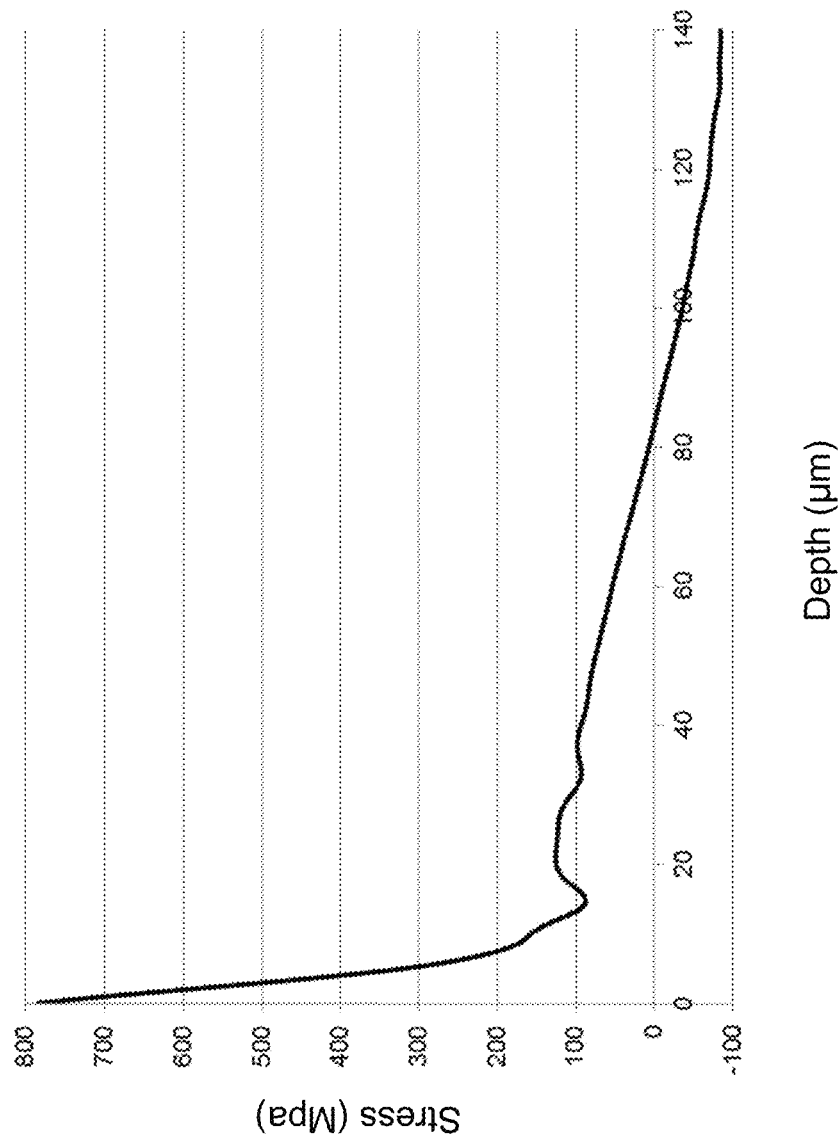
FIG. 16 is a plot of a stress profile extracted from the index profiles of FIG. 15.

The index profiles for transverse magnetic (TM) and transverse electric (TE) guided light were extracted by the IWKB procedure and are shown in FIG. 15. The raw stress profile extracted from the difference of the index profiles is shown in FIG. 16. The stress profile shown in FIG. 16 demonstrates that a spike in compressive stress is present at the surface of the glass article, a region of negative curvature from a depth of about 15 μm to an inflection point located between 80 μm and 100 μm, and a region of positive curvature at larger depths. The raw stress profile include artifacts produced by differences in the turning points of corresponding optical modes in the TM and TE index profiles, with the artifacts being located at depths in the vicinity of and slightly deeper than the bottom of the compressive stress spike at the surface (about 12 μm to about 40 μm). These artifacts can be smoothed based on resemblance to the index profiles to obtain a more accurate stress profile. The compressive stress spike shown in FIG. 16 has a maximum of about 785 MPa and has a depth of about 10 μm, a region of negative curvature from a depth of about 15 μm to an inflection point located at about the depth of compression (DOC), and a region of positive curvature at larger depths. The DOC of the stress profile in FIG. 16 is located about 84 μm (21% of the 0.4 mm thickness of the glass article). A region of constant tension may surround a mid-thickness plane of the glass article, and the stress profile of FIG. 16 exhibits a physical center tension (CT) of about 105 MPa.

The fabrication process that produces the stress profile shown in FIG. 16 maintains the glass article in a non-frangible state throughout the process. This is an additional benefit that reduces the chance of fracture of the glass article during the strengthening process. The compressive stress spike formed in the strengthened glass article guides three optical modes in each of the TM and TE polarization at a wavelength of 595±5 nm. Compressive stress spikes with a depth of greater than about 9 μm and a maximum compressive stress of greater than about 700 MPa that are capable of confining at least three optical modes at 595 nm are capable of reducing fractures of the glass article due to overstress of shallow flaws in the glass article surface during finishing operations performed on the glass article. Additionally, the region of negative curvature that occurs between the bottom of the spike (about 15 μm) and a depth of the inflection point (comparable to the depth of compression, about 90 μm) provides of a region of substantial compressive stress in the depth range of about 0.4DOC to about 0.9DOC (about 34 μm to about 76 μm). This substantial compressive stress region provides improved resistance to fracture from deep damage introductions, such as those produced when the glass article is dropped on a rough surface. In some embodiments, the depth of the inflection point may be about 0.8DOC to about 1.2DOC.

Figure 18:
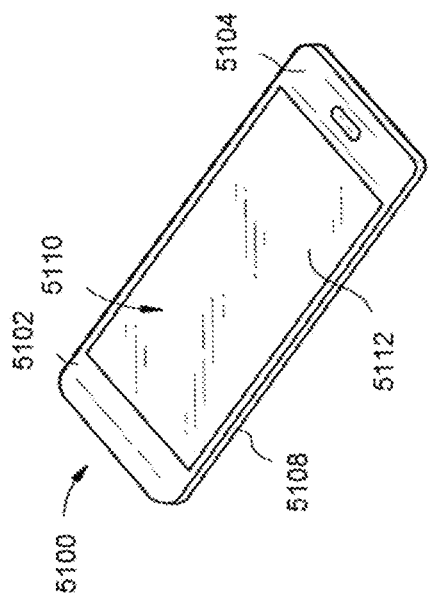
FIG. 18 is a perspective view of the exemplary electronic device of FIG. 17.
Figure 17:
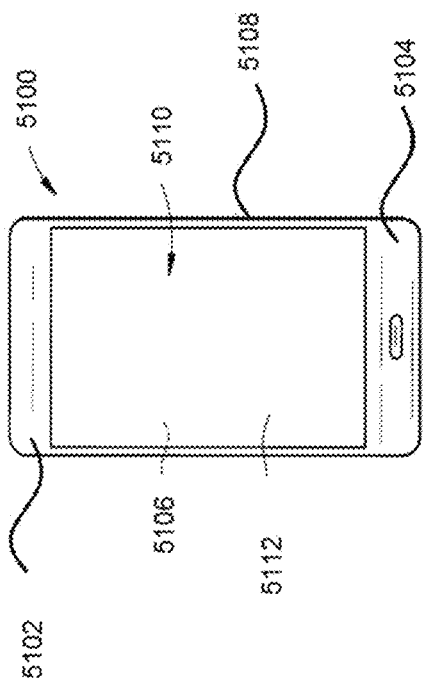
FIG. 17 is a plan view of an exemplary electronic device incorporating any of the strengthened articles disclosed herein.

The strengthened articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the strengthened articles disclosed herein is shown in FIGS. 17 and 18. Specifically, FIGS. 17 and 18 show a consumer electronic device 5100 including a housing 5102 having front 5104, back 5106, and side surfaces 5108; electrical components (not shown) that are at least partially inside or entirely within the housing and including at least a controller, a memory, and a display 5110 at or adjacent to the front surface of the housing; and a cover substrate 5112 at or over the front surface of the housing such that it is over the display. In some embodiments, the cover substrate 5112 may include any of the strengthened articles disclosed herein.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article, comprising:
   opposing first and second surfaces defining a thickness t;
   a center located at t/2;
   a stress profile comprising:
      a compressive region extending from the first surface to a depth of compression (DOC);
      a maximum compressive stress (CS) within the compressive region;
      a first region of the compressive region extending from the first surface to a depth d1, wherein d1>0.06t, and at least a portion of the first region has a first slope m1;
      a second region of the compressive region extending from d1 to the DOC, and having a second slope m2, wherein |m1|≤|m2|;
      a first region sub-region including an entire compressive stress spike extending from the first surface to a depth d2 that is located at a spike compressive stress, and comprising a third slope m3, wherein d2<d1, and |m1|<|m3|; and
      a compressive region sub-region within the compressive region having a negative curvature;
      wherein the spike compressive stress at d2 is in a range from greater than or equal to 150 MPa to less than or equal to 180 MPa.

2. The glass article of claim 1, wherein the DOC is in a range from about 0.14t to about 0.35t.

3. The glass article of claim 1, wherein the DOC is greater than or equal to 90 μm.

4. The glass article of claim 1, wherein 30 MPa/μm≤|m3|≤200 MPa/μm.

5. The glass article of claim 1, wherein the CS in a range from about 500 MPa to about 2,000 MPa.

6. The glass article of claim 1, wherein a maximum absolute value of the negative curvature is at d1.

7. The glass article of claim 1, wherein a maximum absolute value of the negative curvature is between 20 MPa/(t(mm))$^2$ and 4,000 MPa/(t(mm))$^2$.

8. The glass article of claim 1, wherein a slope of the stress profile at d1 is zero.

9. The glass article of claim 1, wherein d2 is less than or equal to 15 μm.

10. The glass article of claim 1 having a planar configuration, wherein t is in a range from about 0.1 mm to about 1 mm.

11. The glass article of claim 1, wherein the negative curvature has an absolute value exceeding 10 MPa/(t(mm))$^2$ over a spatial extent ranging from about 2% to about 25% of t.

12. The glass article of claim 1, wherein the maximum compressive stress CS is at the first surface, and at a depth of less than about 8 μm below the first surface a compressive stress of the article decreases to less than 50% of the maximum compressive stress CS.

13. The glass article of claim 1, further comprising a physical center tension in a range from about 40 MPa/(t(mm))$^{1/2}$ to about 150 MPa/(t(mm))$^{1/2}$.

14. The glass article of claim 1, wherein the glass article comprises at least about 4 mol % $P_2O_5$, wherein ($M_2O_3$(mol %)/$R_xO$(mol %))<1, where $M_2O_3$=$Al_2O_3$+$B_2O_3$, and where $R_xO$ is a sum of monovalent and divalent cation oxides present in the glass article.

15. The glass article of claim 1, wherein the glass article comprises:
 about 40 mol % to about 70 mol % $SiO_2$;
 about 11 mol % to about 25 mol % $Al_2O_3$;
 about 2 mol % to about 15 mol % $P_2O_5$;
 about 10 mol % to about 25 mol % $Na_2O$;
 about 10 to about 30 mol % $R_xO$, where $R_xO$ is a sum of alkali metal oxides, alkaline earth metal oxides, and transition metal monoxides present in the glass article.

16. A glass article, comprising:
 opposing first and second surfaces defining a thickness t;
 a center located at t/2;
 a stress profile comprising:
  a compressive region extending from the first surface to a depth of compression (DOC) that is greater than or equal to 90 μm;
  a maximum compressive stress (CS) within the compressive region in a range from about 500 MPa to about 2,000 MPa;
  a first region of the compressive region extending from the first surface to a depth d1, wherein d1>0.06t, and at least a portion of the first region has a first slope m1;
  a second region extending from d1 to the DOC, and having a second slope m2, wherein |m1|≤|m2|;
  a first region sub-region including an entire compressive stress spike extending from the first surface to a depth d2 that is located at a spike compressive stress, and comprising a third slope m3, wherein: d2<d1, and |m1|<|m3| and 30 MPa/μm≤|m3|≤200 MPa/μm;
  the spike compressive stress at d2 being in a range from greater than or equal to 150 MPa to less than or equal to 180 MPa; and
  a compressive region sub-region within the compressive region with a negative curvature.

17. The glass article of claim 16 having a planar configuration, wherein t is in a range from about 0.1 mm to about 1 mm.

18. The glass article of claim 16, wherein the negative curvature has an absolute value exceeding 10 mPa/(t(mm))$^2$ over a spatial extent ranging from about 2% to about 25% of t.

19. A consumer electronic product, comprising:
 a housing having a front surface, a back surface, and side surfaces;
 electrical components provided at least partially within the housing, the electrical components including at least a controller, a memory, and a display, the display being provided at or adjacent the front surface of the housing; and
 the glass article of claim 16 disposed over the display.

20. A glass article, comprising:
 opposing first and second surfaces defining a thickness t;
 a center located at t/2;
 a stress profile comprising:
  a compressive region extending from the first surface to a depth of compression (DOC);
  a maximum compressive stress (CS) within the compressive region;
  a first region of the compressive region extending from the first surface to a depth d1, wherein d1>0.06t, and at least a portion of the first region has a first slope m1;
  a second region of the compressive region extending from d1 to the DOC, and having a second slope m2, wherein |m1|≤|m2|;
  a first region sub-region extending from the first surface to a depth d2 and comprising a third slope m3, wherein d2<d1, and |m1|<|m3|; and
  a compressive region sub-region within the compressive region having a negative curvature, the negative curvature has an absolute value exceeding 10 MPa/(t(mm))$^2$ over a spatial extent ranging from about 2% to about 25% of t;
 wherein a spike compressive stress at d2 is in a range from greater than or equal to 150 MPa to less than or equal to 180 MPa.

* * * * *